(12) United States Patent
Park et al.

(10) Patent No.: US 10,067,317 B2
(45) Date of Patent: Sep. 4, 2018

(54) OPTICAL SYSTEM

(71) Applicant: Samsung Electro-Mechanics Co., Ltd., Suwon-si (KR)

(72) Inventors: Il Yong Park, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 263 days.

(21) Appl. No.: 14/938,252

(22) Filed: Nov. 11, 2015

(65) Prior Publication Data

US 2016/0154212 A1  Jun. 2, 2016

(30) Foreign Application Priority Data

Nov. 28, 2014  (KR) .......................... 10-2014-0168479

(51) Int. Cl.
*G02B 13/00* (2006.01)
*G02B 27/00* (2006.01)
*G02B 9/60* (2006.01)

(52) U.S. Cl.
CPC ..... *G02B 13/0045* (2013.01); *G02B 27/0025* (2013.01)

(58) Field of Classification Search
CPC .................. G02B 13/0045; G02B 13/0025
USPC .......................................................... 359/714
See application file for complete search history.

(56) References Cited

U.S. PATENT DOCUMENTS

| 8,649,113 | B1* | 2/2014 | Tsai | ................... G02B 13/0045 |
| | | | | 359/714 |
| 9,097,877 | B2* | 8/2015 | Tsai | ................... G02B 13/0045 |
| 9,201,216 | B2* | 12/2015 | Huang | ............... G02B 13/0045 |
| 9,411,134 | B1* | 8/2016 | Chen | ......................... G02B 9/60 |
| 9,435,985 | B2* | 9/2016 | Liao | ......................... G02B 9/60 |
| 2004/0008426 | A1 | 1/2004 | Abe | |
| 2013/0107375 | A1 | 5/2013 | Huang et al. | |
| 2013/0308206 | A1 | 11/2013 | Hsu et al. | |
| 2014/0029116 | A1 | 1/2014 | Tsai et al. | |
| 2014/0211328 | A1 | 7/2014 | Hashimoto et al. | |
| 2015/0103225 | A1 | 4/2015 | Hsu et al. | |
| 2015/0346458 | A1 | 12/2015 | Asami | |

FOREIGN PATENT DOCUMENTS

| CN | 103076665 A | 5/2013 |
| CN | 103901586 A | 7/2014 |
| JP | 11-223762 A | 8/1999 |
| JP | 2000-66095 A | 3/2000 |

(Continued)

OTHER PUBLICATIONS

Korean Office Action dated Aug. 19, 2016 in counterpart Korean Application No. 10-2014-0168479. (18 pages with English Translation).

(Continued)

*Primary Examiner* — William R Alexander
*Assistant Examiner* — Grant Gagnon
(74) *Attorney, Agent, or Firm* — NSIP Law

(57) ABSTRACT

An optical system includes a first lens including a negative refractive power, a second lens, a third lens, a fourth lens, and a fifth lens including a positive refractive power and an image-side surface being concave in a paraxial region. The first to fifth lenses are sequentially disposed from an object side to an image side.

17 Claims, 32 Drawing Sheets

(56) References Cited

FOREIGN PATENT DOCUMENTS

| JP | 2013-92775 A | 5/2013 |
|---|---|---|
| KR | 10-2013-0055137 A | 5/2013 |
| TW | 201235694 A1 | 9/2012 |
| TW | 201245758 A1 | 11/2012 |
| TW | 201403121 A | 1/2013 |
| WO | WO 2014/132317 A1 | 9/2014 |

OTHER PUBLICATIONS

Chinese Office Action dated Jul. 28, 2017 in corresponding Chinese Patent Application No. 201510847683.9. (8 pages in English and 7 pages in Chinese).

Chinese Office Action dated March 19, 2018 in counterpart Chinese Patent Application No. 201510847683.9 (20 pages, in Chinese with English translation).

\* cited by examiner

| Surface | Radius | Thickness | Index | Abbe |
|---|---|---|---|---|
| Object | Infinity | Infinity | | |
| Stop | Infinity | 0.030 | | |
| 2 | 1.50 | 0.482 | 1.544 | 56.1 |
| 3 | 0.82 | 0.634 | | |
| 4 | 1.28 | 0.928 | 1.544 | 56.1 |
| 5 | -1.34 | 0.100 | | |
| 6 | -2.35 | 0.180 | 1.640 | 23.5 |
| 7 | 5.95 | 0.352 | | |
| 8 | -1.50 | 0.330 | 1.544 | 56.1 |
| 9 | -1.18 | 0.105 | | |
| 10 | 1.85 | 0.927 | 1.640 | 23.5 |
| 11 | 1.55 | 0.281 | | |
| 12 | Infinity | 0.210 | 1.517 | 64.2 |
| 13 | Infinity | 0.440 | | |
| Image | Infinity | 0.000 | | |

FIG. 3

| Example 1 | 2 | 3 | 4 | 5 | 6 | 7 | 8 | 9 | 10 | 11 |
|---|---|---|---|---|---|---|---|---|---|---|
| Y RADIUS | 1.497 | 0.821 | 1.283 | -1.341 | -2.347 | 5.955 | -1.502 | -1.184 | 1.85 | 1.548 |
| CONIC CONSTANT(K) | 0.000 | 0.000 | 0.106 | 0.000 | 0.000 | -7.239 | -0.471 | -0.420 | 0.000 | -4.096 |
| 4TH ORDER COEFFICIENT (A) | 0.005 | 0.002 | -0.018 | -0.084 | -0.214 | 0.051 | 0.517 | 0.137 | -0.284 | -0.102 |
| 6TH ORDER COEFFICIENT (B) | -0.001 | -0.030 | -0.052 | -0.476 | -0.888 | -0.569 | -0.854 | -0.136 | 0.174 | 0.049 |
| 8TH ORDER COEFFICIENT (C) | 0.000 | 0.067 | -0.408 | 2.012 | 3.115 | 1.715 | 1.271 | 0.513 | -0.077 | -0.016 |
| 10TH ORDER COEFFICIENT (D) | -0.001 | -0.167 | 1.628 | -4.402 | -4.893 | -2.231 | -1.248 | -0.444 | 0.020 | 0.003 |
| 12TH ORDER COEFFICIENT (E) | 0.000 | 0.000 | -3.664 | 3.122 | 1.963 | 1.367 | 0.531 | 0.125 | -0.002 | 0.000 |
| 14TH ORDER COEFFICIENT (F) | 0.000 | 0.000 | 0.000 | 0.000 | 0.000 | 0.000 | 0.000 | 0.000 | 0.000 | 0.000 |
| 16TH ORDER COEFFICIENT (G) | 0.000 | 0.000 | 0.000 | 0.000 | 0.000 | 0.000 | 0.000 | 0.000 | 0.000 | 0.000 |
| 18TH ORDER COEFFICIENT (H) | 0.000 | 0.000 | 0.000 | 0.000 | 0.000 | 0.000 | 0.000 | 0.000 | 0.000 | 0.000 |
| 20TH ORDER COEFFICIENT (I) | 0.000 | 0.000 | 0.000 | 0.000 | 0.000 | 0.000 | 0.000 | 0.000 | 0.000 | 0.000 |

FIG. 4

| Surface | Radius | Thickness | Index | Abbe |
|---|---|---|---|---|
| Object | Infinity | Infinity | | |
| Stop | Infinity | 0.030 | | |
| 2 | 1.49 | 0.449 | 1.544 | 56.1 |
| 3 | 0.83 | 0.654 | | |
| 4 | 1.28 | 0.934 | 1.544 | 56.1 |
| 5 | -1.35 | 0.100 | | |
| 6 | -2.45 | 0.182 | 1.640 | 23.5 |
| 7 | 5.38 | 0.358 | | |
| 8 | -1.46 | 0.338 | 1.544 | 56.1 |
| 9 | -1.16 | 0.100 | | |
| 10 | 1.88 | 0.940 | 1.640 | 23.5 |
| 11 | 1.51 | 0.265 | | |
| 12 | Infinity | 0.210 | 1.517 | 64.2 |
| 13 | Infinity | 0.440 | | |
| Image | Infinity | 0.000 | | |

FIG. 7

| Example 2 | 2 | 3 | 4 | 5 | 6 | 7 | 8 | 9 | 10 | 11 |
|---|---|---|---|---|---|---|---|---|---|---|
| Y RADIUS | 1.495 | 0.831 | 1.280 | -1.347 | -2.446 | 5.379 | -1.455 | -1.164 | 1.88 | 1.511 |
| CONIC CONSTANT(K) | 0.000 | 0.000 | 0.095 | 0.000 | 0.000 | -7.238 | -0.467 | -0.408 | 0.000 | -4.235 |
| 4TH ORDER COEFFICIENT (A) | 0.003 | -0.004 | -0.021 | -0.088 | -0.234 | 0.039 | 0.507 | 0.121 | -0.293 | -0.103 |
| 6TH ORDER COEFFICIENT (B) | -0.001 | -0.022 | -0.040 | -0.411 | -0.784 | -0.501 | -0.861 | -0.112 | 0.187 | 0.050 |
| 8TH ORDER COEFFICIENT (C) | -0.001 | 0.036 | -0.473 | 1.724 | 2.771 | 1.566 | 1.317 | 0.450 | -0.084 | -0.016 |
| 10TH ORDER COEFFICIENT (D) | 0.000 | -0.118 | 1.808 | -3.704 | -4.344 | -2.064 | -1.296 | -0.362 | 0.022 | 0.003 |
| 12TH ORDER COEFFICIENT (E) | 0.000 | 0.000 | -3.774 | 2.445 | 1.620 | 1.284 | 0.554 | 0.092 | -0.003 | 0.000 |
| 14TH ORDER COEFFICIENT (F) | 0.000 | 0.000 | 0.000 | 0.000 | 0.000 | 0.000 | 0.000 | 0.000 | 0.000 | 0.000 |
| 16TH ORDER COEFFICIENT (G) | 0.000 | 0.000 | 0.000 | 0.000 | 0.000 | 0.000 | 0.000 | 0.000 | 0.000 | 0.000 |
| 18TH ORDER COEFFICIENT (H) | 0.000 | 0.000 | 0.000 | 0.000 | 0.000 | 0.000 | 0.000 | 0.000 | 0.000 | 0.000 |
| 20TH ORDER COEFFICIENT (J) | 0.000 | 0.000 | 0.000 | 0.000 | 0.000 | 0.000 | 0.000 | 0.000 | 0.000 | 0.000 |

FIG. 8

| Surface | Radius | Thickness | Index | Abbe |
|---|---|---|---|---|
| Object | Infinity | Infinity | | |
| Stop | Infinity | 0.030 | | |
| 2 | 1.49 | 0.450 | 1.544 | 56.1 |
| 3 | 0.82 | 0.641 | | |
| 4 | 1.26 | 0.921 | 1.544 | 56.1 |
| 5 | -1.32 | 0.100 | | |
| 6 | -2.37 | 0.220 | 1.640 | 23.5 |
| 7 | 5.26 | 0.322 | | |
| 8 | -1.44 | 0.344 | 1.544 | 56.1 |
| 9 | -1.14 | 0.101 | | |
| 10 | 1.84 | 0.910 | 1.640 | 23.5 |
| 11 | 1.48 | 0.265 | | |
| 12 | Infinity | 0.206 | 1.517 | 64.2 |
| 13 | Infinity | 0.444 | | |
| Image | Infinity | 0.000 | | |

FIG. 11

| Example 3 | 2 | 3 | 4 | 5 | 6 | 7 | 8 | 9 | 10 | 11 |
|---|---|---|---|---|---|---|---|---|---|---|
| Y RADIUS | 1.488 | 0.819 | 1.260 | -1.317 | -2.375 | 5.264 | -1.442 | -1.143 | 1.85 | 1.481 |
| CONIC CONSTANT(K) | 0.000 | 0.000 | 0.096 | 0.000 | 0.000 | -7.238 | -0.471 | -0.399 | 0.000 | -4.515 |
| 4TH ORDER COEFFICIENT (A) | 0.002 | -0.007 | -0.021 | -0.098 | -0.270 | 0.035 | 0.539 | 0.125 | -0.284 | -0.102 |
| 6TH ORDER COEFFICIENT (B) | 0.000 | -0.023 | -0.060 | -0.444 | -0.715 | -0.452 | -0.957 | -0.111 | 0.174 | 0.051 |
| 8TH ORDER COEFFICIENT (C) | -0.001 | 0.034 | -0.458 | 2.174 | 2.827 | 1.410 | 1.507 | 0.477 | -0.077 | -0.017 |
| 10TH ORDER COEFFICIENT (D) | 0.000 | -0.137 | 1.963 | -5.213 | -4.927 | -1.850 | -1.504 | -0.376 | 0.020 | 0.003 |
| 12TH ORDER COEFFICIENT (E) | 0.000 | 0.000 | -4.481 | 3.981 | 2.025 | 1.160 | 0.650 | 0.087 | -0.002 | 0.000 |
| 14TH ORDER COEFFICIENT (F) | 0.000 | 0.000 | 0.000 | 0.000 | 0.000 | 0.000 | 0.000 | 0.000 | 0.000 | 0.000 |
| 16TH ORDER COEFFICIENT (G) | 0.000 | 0.000 | 0.000 | 0.000 | 0.000 | 0.000 | 0.000 | 0.000 | 0.000 | 0.000 |
| 18TH ORDER COEFFICIENT (H) | 0.000 | 0.000 | 0.000 | 0.000 | 0.000 | 0.000 | 0.000 | 0.000 | 0.000 | 0.000 |
| 20TH ORDER COEFFICIENT (J) | 0.000 | 0.000 | 0.000 | 0.000 | 0.000 | 0.000 | 0.000 | 0.000 | 0.000 | 0.000 |

FIG. 12

| Surface | Radius | Thickness | Index | Abbe |
|---|---|---|---|---|
| Object | Infinity | Infinity | | |
| Stop | Infinity | 0.030 | | |
| 2 | 1.50 | 0.472 | 1.544 | 56.1 |
| 3 | 0.83 | 0.639 | | |
| 4 | 1.26 | 0.936 | 1.544 | 56.1 |
| 5 | -1.35 | 0.100 | | |
| 6 | -2.54 | 0.220 | 1.640 | 23.5 |
| 7 | 4.87 | 0.322 | | |
| 8 | -1.43 | 0.349 | 1.544 | 56.1 |
| 9 | -1.14 | 0.100 | | |
| 10 | 1.85 | 0.910 | 1.640 | 23.5 |
| 11 | 1.50 | 0.265 | | |
| 12 | Infinity | 0.206 | 1.517 | 64.2 |
| 13 | Infinity | 0.453 | | |
| Image | Infinity | 0.000 | | |

FIG. 15

| Example 4 | 2 | 3 | 4 | 5 | 6 | 7 | 8 | 9 | 10 | 11 |
|---|---|---|---|---|---|---|---|---|---|---|
| Y RADIUS | 1.504 | 0.825 | 1.262 | -1.347 | -2.538 | 4.872 | -1.426 | -1.139 | 1.85 | 1.504 |
| CONIC CONSTANT(K) | 0.000 | 0.000 | 0.115 | 0.000 | 0.000 | -7.238 | -0.478 | -0.391 | 0.000 | -4.515 |
| 4TH ORDER COEFFICIENT (A) | 0.000 | -0.011 | -0.022 | -0.104 | -0.280 | 0.028 | 0.517 | 0.118 | -0.296 | -0.100 |
| 6TH ORDER COEFFICIENT (B) | -0.001 | -0.027 | -0.063 | -0.374 | -0.577 | -0.391 | -0.915 | -0.113 | 0.191 | 0.049 |
| 8TH ORDER COEFFICIENT (C) | 0.000 | 0.038 | -0.344 | 1.856 | 2.137 | 1.204 | 1.465 | 0.441 | -0.087 | -0.016 |
| 10TH ORDER COEFFICIENT (D) | 0.000 | -0.124 | 1.489 | -4.436 | -3.444 | -1.554 | -1.466 | -0.310 | 0.022 | 0.003 |
| 12TH ORDER COEFFICIENT (E) | 0.000 | 0.000 | -3.515 | 3.327 | 0.865 | 0.969 | 0.636 | 0.059 | -0.003 | 0.000 |
| 14TH ORDER COEFFICIENT (F) | 0.000 | 0.000 | 0.000 | 0.000 | 0.000 | 0.000 | 0.000 | 0.000 | 0.000 | 0.000 |
| 16TH ORDER COEFFICIENT (G) | 0.000 | 0.000 | 0.000 | 0.000 | 0.000 | 0.000 | 0.000 | 0.000 | 0.000 | 0.000 |
| 18TH ORDER COEFFICIENT (H) | 0.000 | 0.000 | 0.000 | 0.000 | 0.000 | 0.000 | 0.000 | 0.000 | 0.000 | 0.000 |
| 20TH ORDER COEFFICIENT (J) | 0.000 | 0.000 | 0.000 | 0.000 | 0.000 | 0.000 | 0.000 | 0.000 | 0.000 | 0.000 |

FIG. 16

| Surface | Radius | Thickness | Index | Abbe |
|---|---|---|---|---|
| Object | Infinity | Infinity | | |
| Stop | Infinity | 0.030 | | |
| 2 | 1.48 | 0.474 | 1.544 | 56.1 |
| 3 | 0.82 | 0.644 | | |
| 4 | 1.26 | 0.932 | 1.544 | 56.1 |
| 5 | -1.35 | 0.100 | | |
| 6 | -2.67 | 0.220 | 1.640 | 23.5 |
| 7 | 4.31 | 0.305 | | |
| 8 | -1.43 | 0.351 | 1.544 | 56.1 |
| 9 | -1.14 | 0.100 | | |
| 10 | 1.90 | 0.920 | 1.640 | 23.5 |
| 11 | 1.58 | 0.265 | | |
| 12 | Infinity | 0.206 | 1.517 | 64.2 |
| 13 | Infinity | 0.455 | | |
| Image | Infinity | 0.000 | | |

FIG. 19

| Example 5 | 2 | 3 | 4 | 5 | 6 | 7 | 8 | 9 | 10 | 11 |
|---|---|---|---|---|---|---|---|---|---|---|
| Y RADIUS | 1.476 | 0.817 | 1.260 | -1.348 | -2.672 | 4.314 | -1.427 | -1.140 | 1.90 | 1.582 |
| CONIC CONSTANT(K) | 0.000 | 0.000 | 0.121 | 0.000 | 0.000 | -7.238 | -0.512 | -0.390 | 0.000 | -4.515 |
| 4TH ORDER COEFFICIENT (A) | 0.001 | -0.009 | -0.021 | -0.101 | -0.292 | 0.025 | 0.512 | 0.116 | -0.282 | -0.098 |
| 6TH ORDER COEFFICIENT (B) | -0.001 | -0.048 | -0.082 | -0.362 | -0.525 | -0.366 | -0.909 | -0.119 | 0.178 | 0.046 |
| 8TH ORDER COEFFICIENT (C) | 0.001 | 0.087 | -0.219 | 1.832 | 1.901 | 1.134 | 1.488 | 0.428 | -0.077 | -0.015 |
| 10TH ORDER COEFFICIENT (D) | -0.001 | -0.178 | 1.136 | -4.435 | -2.872 | -1.447 | -1.512 | -0.260 | 0.019 | 0.003 |
| 12TH ORDER COEFFICIENT (E) | 0.000 | 0.000 | -3.106 | 3.351 | 0.203 | 0.888 | 0.667 | 0.029 | -0.002 | 0.000 |
| 14TH ORDER COEFFICIENT (F) | 0.000 | 0.000 | 0.000 | 0.000 | 0.000 | 0.000 | 0.000 | 0.000 | 0.000 | 0.000 |
| 16TH ORDER COEFFICIENT (G) | 0.000 | 0.000 | 0.000 | 0.000 | 0.000 | 0.000 | 0.000 | 0.000 | 0.000 | 0.000 |
| 18TH ORDER COEFFICIENT (H) | 0.000 | 0.000 | 0.000 | 0.000 | 0.000 | 0.000 | 0.000 | 0.000 | 0.000 | 0.000 |
| 20TH ORDER COEFFICIENT (J) | 0.000 | 0.000 | 0.000 | 0.000 | 0.000 | 0.000 | 0.000 | 0.000 | 0.000 | 0.000 |

FIG. 20

| Surface | Radius | Thickness | Index | Abbe |
|---|---|---|---|---|
| Object | Infinity | Infinity | | |
| Stop | Infinity | 0.030 | | |
| 2 | 1.45 | 0.480 | 1.544 | 56.1 |
| 3 | 0.81 | 0.649 | | |
| 4 | 1.26 | 0.927 | 1.544 | 56.1 |
| 5 | -1.34 | 0.100 | | |
| 6 | -2.82 | 0.220 | 1.640 | 23.5 |
| 7 | 3.86 | 0.285 | | |
| 8 | -1.43 | 0.354 | 1.544 | 56.1 |
| 9 | -1.14 | 0.100 | | |
| 10 | 1.95 | 0.920 | 1.640 | 23.5 |
| 11 | 1.66 | 0.265 | | |
| 12 | Infinity | 0.206 | 1.517 | 64.2 |
| 13 | Infinity | 0.466 | | |
| Image | Infinity | 0.000 | | |

FIG. 23

| Example 6 | 2 | 3 | 4 | 5 | 6 | 7 | 8 | 9 | 10 | 11 |
|---|---|---|---|---|---|---|---|---|---|---|
| Y RADIUS | 1.446 | 0.806 | 1.260 | -1.342 | -2.819 | 3.857 | -1.425 | -1.136 | 1.95 | 1.663 |
| CONIC CONSTANT (K) | 0.000 | 0.000 | 0.128 | 0.000 | 0.000 | -7.238 | -0.575 | -0.395 | 0.000 | -4.515 |
| 4TH ORDER COEFFICIENT (A) | 0.002 | -0.002 | -0.019 | -0.099 | -0.307 | 0.021 | 0.506 | 0.109 | -0.272 | -0.099 |
| 6TH ORDER COEFFICIENT (B) | -0.003 | -0.079 | -0.095 | -0.328 | -0.466 | -0.334 | -0.889 | -0.097 | 0.168 | 0.046 |
| 8TH ORDER COEFFICIENT (C) | 0.002 | 0.162 | -0.146 | 1.690 | 1.651 | 1.045 | 1.459 | 0.347 | -0.071 | -0.015 |
| 10TH ORDER COEFFICIENT (D) | -0.001 | -0.259 | 0.961 | -4.127 | -2.341 | -1.317 | -1.455 | -0.118 | 0.017 | 0.003 |
| 12TH ORDER COEFFICIENT (E) | 0.000 | 0.000 | -2.941 | 3.053 | -0.385 | 0.788 | 0.627 | -0.046 | -0.002 | 0.000 |
| 14TH ORDER COEFFICIENT (F) | 0.000 | 0.000 | 0.000 | 0.000 | 0.000 | 0.000 | 0.000 | 0.000 | 0.000 | 0.000 |
| 16TH ORDER COEFFICIENT (G) | 0.000 | 0.000 | 0.000 | 0.000 | 0.000 | 0.000 | 0.000 | 0.000 | 0.000 | 0.000 |
| 18TH ORDER COEFFICIENT (H) | 0.000 | 0.000 | 0.000 | 0.000 | 0.000 | 0.000 | 0.000 | 0.000 | 0.000 | 0.000 |
| 20TH ORDER COEFFICIENT (J) | 0.000 | 0.000 | 0.000 | 0.000 | 0.000 | 0.000 | 0.000 | 0.000 | 0.000 | 0.000 |

FIG. 24

| Surface | Radius | Thickness | Index | Abbe |
|---|---|---|---|---|
| Object | Infinity | Infinity | | |
| Stop | Infinity | 0.030 | | |
| 2 | 1.43 | 0.519 | 1.544 | 56.1 |
| 3 | 0.79 | 0.663 | | |
| 4 | 1.27 | 0.900 | 1.544 | 56.1 |
| 5 | −1.34 | 0.100 | | |
| 6 | −2.88 | 0.220 | 1.640 | 23.5 |
| 7 | 3.59 | 0.270 | | |
| 8 | −1.45 | 0.360 | 1.544 | 56.1 |
| 9 | −1.13 | 0.102 | | |
| 10 | 2.00 | 0.920 | 1.640 | 23.5 |
| 11 | 1.75 | 0.265 | | |
| 12 | Infinity | 0.110 | 1.514 | 54.6 |
| 13 | Infinity | 0.541 | | |
| Image | Infinity | 0.000 | | |

FIG. 27

| Example 7 | 2 | 3 | 4 | 5 | 6 | 7 | 8 | 9 | 10 | 11 |
|---|---|---|---|---|---|---|---|---|---|---|
| Y RADIUS | 1.431 | 0.795 | 1.268 | -1.339 | -2.885 | 3.589 | -1.453 | -1.128 | 2.00 | 1.746 |
| CONIC CONSTANT(K) | 0.000 | 0.000 | 0.118 | 0.000 | 0.000 | -7.238 | -0.599 | -0.396 | 0.000 | -4.515 |
| 4TH ORDER COEFFICIENT (A) | 0.004 | 0.010 | -0.019 | -0.096 | -0.307 | 0.022 | 0.499 | 0.100 | -0.261 | -0.104 |
| 6TH ORDER COEFFICIENT (B) | -0.006 | -0.152 | -0.100 | -0.346 | -0.530 | -0.343 | -0.852 | -0.043 | 0.159 | 0.048 |
| 8TH ORDER COEFFICIENT (C) | 0.005 | 0.347 | -0.190 | 1.756 | 2.073 | 1.104 | 1.328 | 0.179 | -0.065 | -0.016 |
| 10TH ORDER COEFFICIENT (D) | -0.002 | -0.461 | 1.215 | -4.357 | -3.523 | -1.425 | -1.194 | 0.130 | 0.015 | 0.003 |
| 12TH ORDER COEFFICIENT (E) | 0.000 | 0.000 | -3.510 | 3.211 | 0.775 | 0.847 | 0.438 | -0.168 | -0.002 | 0.000 |
| 14TH ORDER COEFFICIENT (F) | 0.000 | 0.000 | 0.000 | 0.000 | 0.000 | 0.000 | 0.000 | 0.000 | 0.000 | 0.000 |
| 16TH ORDER COEFFICIENT (G) | 0.000 | 0.000 | 0.000 | 0.000 | 0.000 | 0.000 | 0.000 | 0.000 | 0.000 | 0.000 |
| 18TH ORDER COEFFICIENT (H) | 0.000 | 0.000 | 0.000 | 0.000 | 0.000 | 0.000 | 0.000 | 0.000 | 0.000 | 0.000 |
| 20TH ORDER COEFFICIENT (J) | 0.000 | 0.000 | 0.000 | 0.000 | 0.000 | 0.000 | 0.000 | 0.000 | 0.000 | 0.000 |

FIG. 28

| Surface | Radius | Thickness | Index | Abbe |
|---|---|---|---|---|
| Object | Infinity | Infinity | | |
| Stop | Infinity | 0.030 | | |
| 2 | 1.43 | 0.529 | 1.544 | 56.1 |
| 3 | 0.79 | 0.668 | | |
| 4 | 1.27 | 0.900 | 1.544 | 56.1 |
| 5 | -1.33 | 0.100 | | |
| 6 | -3.01 | 0.220 | 1.640 | 23.5 |
| 7 | 3.40 | 0.256 | | |
| 8 | -1.43 | 0.365 | 1.544 | 56.1 |
| 9 | -1.09 | 0.122 | | |
| 10 | 2.00 | 0.850 | 1.640 | 23.5 |
| 11 | 1.75 | 0.265 | | |
| 12 | Infinity | 0.110 | 1.514 | 54.6 |
| 13 | Infinity | 0.587 | | |
| Image | Infinity | 0.000 | | |

FIG. 31

| Example 8 | 2 | 3 | 4 | 5 | 6 | 7 | 8 | 9 | 10 | 11 |
|---|---|---|---|---|---|---|---|---|---|---|
| Y RADIUS | 1.427 | 0.789 | 1.274 | -1.332 | -3.012 | 3.404 | -1.429 | -1.090 | 2.00 | 1.746 |
| CONIC CONSTANT(K) | 0.000 | 0.000 | 0.122 | 0.000 | 0.000 | -7.238 | -0.589 | -0.408 | 0.000 | -4.515 |
| 4TH ORDER COEFFICIENT (A) | 0.005 | 0.015 | -0.018 | -0.095 | -0.315 | 0.022 | 0.460 | 0.087 | -0.253 | -0.110 |
| 6TH ORDER COEFFICIENT (B) | -0.005 | -0.154 | -0.097 | -0.361 | -0.511 | -0.333 | -0.757 | 0.006 | 0.152 | 0.053 |
| 8TH ORDER COEFFICIENT (C) | 0.003 | 0.341 | -0.207 | 1.894 | 1.875 | 1.064 | 1.256 | 0.077 | -0.061 | -0.018 |
| 10TH ORDER COEFFICIENT (D) | -0.001 | -0.451 | 1.263 | -4.772 | -2.887 | -1.378 | -1.153 | 0.301 | 0.014 | 0.004 |
| 12TH ORDER COEFFICIENT (E) | 0.000 | 0.000 | -3.552 | 3.675 | 0.100 | 0.807 | 0.385 | -0.269 | -0.002 | 0.000 |
| 14TH ORDER COEFFICIENT (F) | 0.000 | 0.000 | 0.000 | 0.000 | 0.000 | 0.000 | 0.000 | 0.000 | 0.000 | 0.000 |
| 16TH ORDER COEFFICIENT (G) | 0.000 | 0.000 | 0.000 | 0.000 | 0.000 | 0.000 | 0.000 | 0.000 | 0.000 | 0.000 |
| 18TH ORDER COEFFICIENT (H) | 0.000 | 0.000 | 0.000 | 0.000 | 0.000 | 0.000 | 0.000 | 0.000 | 0.000 | 0.000 |
| 20TH ORDER COEFFICIENT (J) | 0.000 | 0.000 | 0.000 | 0.000 | 0.000 | 0.000 | 0.000 | 0.000 | 0.000 | 0.000 |

FIG. 32

OPTICAL SYSTEM

CROSS-REFERENCE TO RELATED APPLICATION

This application claims the priority and benefit under 35 USC 119(a) of Korean Patent Application No. 10-2014-0168479 filed on Nov. 28, 2014, with the Korean Intellectual Property Office, the disclosure of which is incorporated herein by reference.

BACKGROUND

1. Field

The following description relates to an optical system.

2. Description of Related Art

Mobile communications terminals normally include camera modules to capture images and record video calls. In addition, as levels of functionality of cameras in such mobile communications terminals have gradually increased, there is a demand for the camera modules in mobile communications terminals to have higher levels of resolution and performance.

However, because a trend for mobile communications terminals to be miniaturized and lightened exists, there are limitations in obtaining camera modules having high levels of resolution and high degrees of performance.

In order to solve such issues, camera lenses in the camera modules have been formed of plastic, which is a material lighter than glass, and the number of the camera lenses have been configured to include five or more lenses to achieve high levels of resolution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical system, including: a first lens including a negative refractive power; a second lens; a third lens; a fourth lens; and a fifth lens including a positive refractive power and an image-side surface being concave in a paraxial region, wherein the first to fifth lenses are sequentially disposed from an object side to an image side.

f1, a focal length of the first lens is f1 and, f, an overall focal length of the optical system including the first to fifth lenses may satisfy $-3.0<f1/f<-1.0$.

v1, an Abbe number of the first lens, v2, an Abbe number of the second lens, v3, an Abbe number of the third lens and, v5, an Abbe number of the fifth lens may satisfy at least one of $20<v2-v3<40$, $20<v1-v3<40$ and $20<v1-v5<40$.

f2, a focal length of the second lens is f2 and, f, an overall focal length of the optical system including the first to fifth lenses may satisfy $0<f2/f<1.2$.

f3, a focal length of the third lens and, f, an overall focal length of the optical system including the first to fifth lenses may satisfy $0<|f3/f|<2.0$.

f4, a focal length of the fourth lens, f5, a focal length of the fifth lens, and, f, an overall focal length of the optical system including the first to fifth lenses may satisfy at least one of $f4/f>2.0$ and $f5/f>0$.

The optical system may also include an image sensor configured to convert an image of a subject incident through the first to fifth lenses into an electric signal, wherein, OAL, a distance from an object-side surface of the first lens to an imaging surface of the image sensor and, f, an overall focal length of the optical system including the first to fifth lenses may satisfy $OAL/f<2.2$.

f1, a focal length of the first lens and, f2, a focal length of the second lens may satisfy $1.0<|f1/f2|<5.0$.

f2, a focal length of the second lens and, f3, a focal length of the third lens may satisfy $0.0<|f2/f3|<1.4$.

The optical system may also include an image sensor configured to convert an image of a subject incident through the first to fifth lenses into an electric signal, wherein, BFL, a distance from an image-side surface of the fifth lens to an imaging surface of the image sensor and, f, an overall focal length of the optical system including the first to fifth lenses may satisfy $BFL/f<0.55$.

D1, a distance from an image-side surface of the first lens to an object-side surface of the second lens and, f, an overall focal length of the optical system including the first to fifth lenses may satisfy $D1/f<0.5$.

r3, a radius of curvature of an object-side surface of the second lens, and, f, an overall focal length of the optical system including the first to fifth lenses may satisfy $r3/f>0.4$.

r8, a radius of curvature of an image-side surface of the fourth lens and, f, an overall focal length of the optical system including the first to fifth lenses may satisfy $|r8/f|>0.3$.

FOV, a field of view of the optical system may satisfy $FOV>80$.

FNO, an inverse number of an aperture ratio of the optical system may satisfy $FNO<2.2$.

At least one inflection point may be formed on at least one of the first and second surfaces of the fifth lens, and an absolute value of a radius of curvature of a second surface of the fifth lens in a paraxial region is larger than an absolute value of a radius of curvature of the first surface of the fifth lens in the paraxial region.

In accordance with an embodiment, there is provided an optical system, including: a first lens including a negative refractive power; a second lens; a third lens; a fourth lens including a positive refractive power; and a fifth lens including a positive refractive power and an image-side surface being concave in a paraxial region, wherein the first to fifth lenses are sequentially disposed from an object side and an image side.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table illustrating respective characteristics of lenses in the optical system illustrated in FIG. 1;

FIG. 4 is a table illustrating respective aspherical surface coefficients of lenses in the optical system illustrated in FIG. 1;

FIG. 7 is a table illustrating respective characteristics of lenses in the optical system illustrated in FIG. 5;

FIG. 8 is a table illustrating respective aspherical surface coefficients of lenses in the optical system illustrated in FIG. 5;

FIG. 11 is a table illustrating respective characteristics of lenses in the optical system illustrated in FIG. 9;

FIG. 12 is a table illustrating respective aspherical surface coefficients of lenses of the optical system illustrated in FIG. 9;

FIG. 15 is a table illustrating respective characteristics of lenses in the optical system illustrated in FIG. 13;

FIG. 16 is a table illustrating respective aspherical surface coefficients of lenses in the optical system illustrated in FIG. 13;

FIG. 19 is a table illustrating respective characteristics of lenses in the optical system illustrated in FIG. 17;

FIG. 20 is a table illustrating respective aspherical surface coefficients of lenses in the optical system illustrated in FIG. 17;

FIG. 23 is a table illustrating respective characteristics of lenses in the optical system illustrated in FIG. 21;

FIG. 24 is a table illustrating respective aspherical surface coefficients of lenses in the optical system illustrated in FIG. 21;

FIG. 27 is a table illustrating respective characteristics of lenses in the optical system illustrated in FIG. 25;

FIG. 28 is a table illustrating respective aspherical surface coefficients of lenses in the optical system illustrated in FIG. 25;

FIG. 31 is a table illustrating respective characteristics of lenses in the optical system illustrated in FIG. 29; and FIG. 32 is a table illustrating respective aspherical surface coefficients of lenses of the optical system illustrated in FIG. 29.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
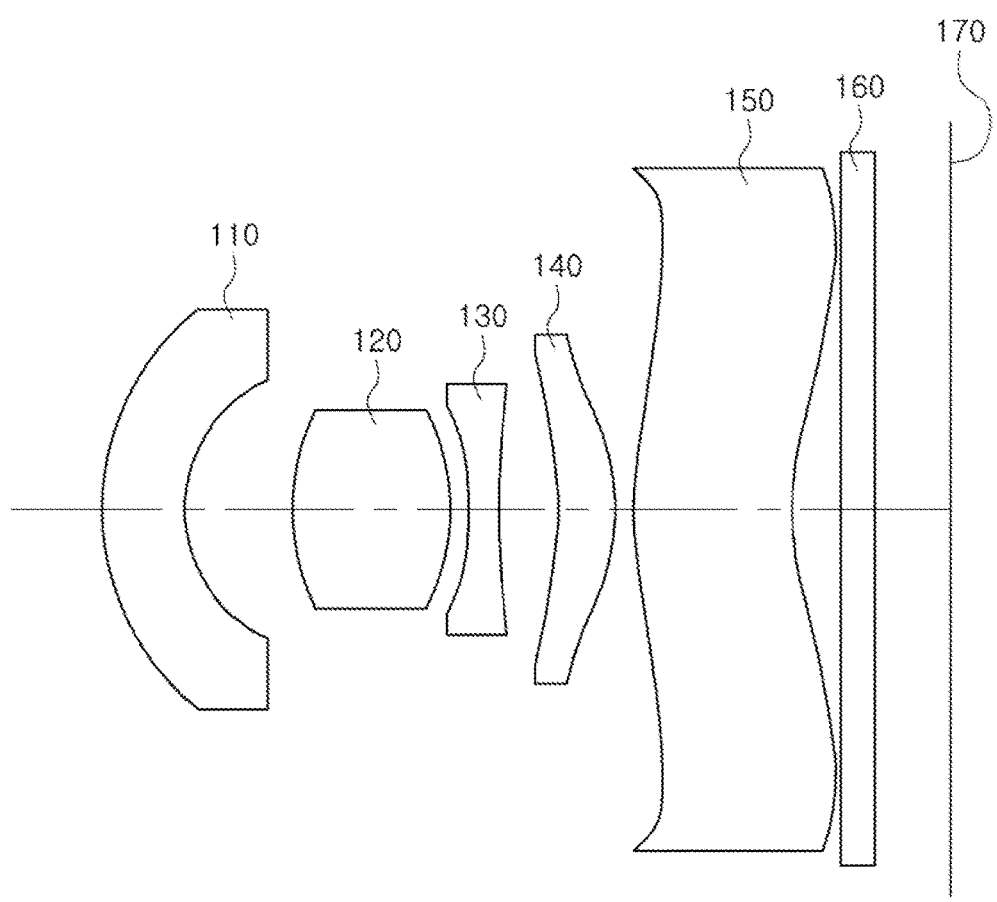
FIG. 1 is a view of an optical system, according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

In the drawings, the shapes and dimensions of elements may be exaggerated for clarity, and the same reference numerals will be used throughout to designate the same or like elements, and here, the thicknesses, sizes, and shapes of lenses have been slightly exaggerated for convenience of explanation. The shapes of spherical surfaces or aspherical surfaces illustrated in the drawings are illustrated by way of example. That is, the shapes of the spherical surfaces or the aspherical surfaces are not limited to those illustrated in the drawings.

In addition, it is to be noted that a first lens is a lens closest to an object to be captured, while a fifth lens is a lens closest to an imaging surface of an image sensor.

Further, it is to be noted that in an optical system, the term 'front' refers to a direction toward the object, while the term 'rear' in the optical system, refers to a direction toward the image sensor. In addition, a first surface of each lens refers to a surface or an object-side surface thereof closest to an object and a second surface of each lens refers to a surface or an image-side surface thereof closest to an imaging surface of an image sensor. In the description below, when two surfaces are referred to, that means that the first or object-side surface and the second or image-side surface are being discussed. Further, all numerical values of radii of curvature, thicknesses, and other parameters of the lenses are indicated in millimeters (mm). However, a person of ordinary skill in the art will appreciate that other units of measurements may be used.

Further, a paraxial region refers to a very narrow region in the vicinity of an optical axis. Paraxial region or space region near an axis is where the angle $\alpha$ between rays and optical axis is so small that $\sin a$ and $\tan a$ can be replaced with sufficient accuracy by the angle $\alpha$.

In accordance with an illustrative example, the embodiments described of the optical system include five lenses. However, a person of ordinary skill in the relevant art will appreciate that the number of lenses in the optical system may vary, for example, between two to six lenses, while achieving the various results and benefits described hereinbelow.

As illustrated and described below, in one illustrative example, the optical system includes a first lens, a second lens, a third lens, a fourth lens, and a fifth lens. However, the optical system is not limited to including only five lenses, but may further include other components, if necessary. For example, the optical system may further include a stop controlling an amount of light incident therein.

In addition, the optical system may further include an infrared cut-off filter filtering infrared light. Further, the optical system may further include an image sensor converting an image of a subject incident on the image sensor into electrical signals. Further, the optical system may further include a gap maintaining member to adjust a gap between lenses.

In some configurations, lenses included in lens modules are formed of plastic or polycarbonate, a material lighter than glass. In other configurations, some of the lenses included in the modules are formed of plastic or polycarbonate, and other lenses may be formed of glass. According to some configurations, a lens module may include five or more lenses in order to achieve high levels of resolution in images being captured.

In addition, at least one of the first to fifth lenses has an aspherical object-side or image-side surface. Further, each of the first to fifth lenses may have at least one aspherical object-side or image-side surface.

That is, at least one of first and second surfaces of the first to fifth lenses may be aspherical. In one example, the aspherical surfaces of the first to fifth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots$$ [Equation 1]

In this equation, c is curvature (an inverse of a radius of curvature) at an apex of the lens, K is a conic constant, and Y is a distance from a certain point on the aspherical surface of the lens to an optical axis in a direction perpendicular to the optical axis. In addition, constants A to F are aspherical surface coefficients. In addition, Z is a distance between the certain point on the aspherical surface at the distance Y and a tangential plane meeting the apex of the aspherical surface of the lens.

Each of the first through sixth lenses has a refractive power, either negative or positive. For instance, in one configuration, from the object side towards the image side, the first lens has a positive refractive power, the second lens has a positive refractive power, the third lens has a negative refractive power, the fourth lens has a positive refractive power, the fifth lens has a negative refractive power, and the sixth lens has a negative refractive power. Persons skilled in the relevant art will appreciate that each of the first and sixth lenses may be configured in an opposite refractive power from the configuration described above. For example, in an alternative configuration, the first lens has a positive refractive power, the second lens has a positive refractive power, the third lens has a negative refractive power, the fourth lens has a negative refractive power, and the fifth lens has a positive refractive power.

The optical system configured as described above improves optical performance through aberration improvement.

The optical system, according to embodiments satisfies Conditional Expression 1.

$3.0 < f1/f < -1.0$ [Conditional Expression 1]

In this expression, f1 is a focal length of the first lens, and f is an overall focal length of the optical system.

The optical system, according to embodiments, satisfies Conditional Expression 2.

$20 < v2 - v3 < 40$ [Conditional Expression 2]

In this expression, v2 is an Abbe number of the second lens, and v3 is an Abbe number of the third lens.

The optical system, according to exemplary embodiments, satisfies Conditional Expression 3.

$20 < v1 - v3 < 40$ [Conditional Expression 3]

In this expression, v1 is an Abbe number of the first lens, and v3 is the Abbe number of the third lens.

The optical system, according to embodiments, satisfies Conditional Expression 4.

$20 < v1 - v5 < 40$ [Conditional Expression 4]

In this expression, v1 is the Abbe number of the first lens, and v5 is an Abbe number of the fifth lens.

The optical system, according to embodiments, satisfies Conditional Expression 5.

$0 < f2/f < 1.2$ [Conditional Expression 5]

In this expression, f2 is a focal length of the second lens, and f is the overall focal length of the optical system.

The optical system according to exemplary embodiments may satisfy Conditional Expression 6.

$0 < |f3/f| < 2.0$ [Conditional Expression 6]

In this example, f3 is a focal length of the third lens, and f is the overall focal length of the optical system.

The optical system, according to embodiments, satisfies Conditional Expression 7.

$f4/f > 2.0$ [Conditional Expression 7]

In this expression, f4 is a focal length of the fourth lens, and f is the overall focal length of the optical system.

The optical system, according to embodiments, satisfies Conditional Expression 8.

$f5/f > 0$ [Conditional Expression 8]

In this expression, f5 is a focal length of the fifth lens, and f is the overall focal length of the optical system.

The optical system, according to embodiments, satisfies Conditional Expression 9.

$OAL/f < 2.2$ [Conditional Expression 9]

In this expression, OAL is a distance from an object-side surface of the first lens to an imaging surface of the image sensor, and f is the overall focal length of the optical system.

The optical system, according to embodiments, satisfies Conditional Expression 10.

$1.0 < |f1/f2| < 5.0$ [Conditional Expression 10]

In this expression, f1 is the focal length of the first lens, and f2 is the focal length of the second lens.

The optical system, according to embodiments, satisfies Conditional Expression 11.

$0.0 < |f2/f3| < 1.4$ [Conditional Expression 11]

In this expression, f2 is the focal length of the second lens, and f3 is the focal length of the third lens.

The optical system, according to embodiments, satisfies Conditional Expression 12.

$$BFL/f<0.55 \quad \text{[Conditional Expression 12]}$$

In this expression, BFL is a distance from an image-side surface of the fifth lens to the imaging surface of the image sensor, and f is the overall focal length of the optical system.

The optical system, according to embodiments, satisfies Conditional Expression 13.

$$D1/f<0.5 \quad \text{[Conditional Expression 13]}$$

In this expression, D1 is a distance from an image-side surface of the first lens to an object-side surface of the second lens, and f is the overall focal length of the optical system.

The optical system, according to embodiments, satisfies Conditional Expression 14.

$$r3/f>0.4 \quad \text{[Conditional Expression 14]}$$

In this expression, r3 is a radius of curvature of the object-side surface of the second lens, and f is the overall focal length of the optical system.

The optical system, according to embodiments, satisfies Conditional Expression 15.

$$|r8/f|>0.3 \quad \text{[Conditional Expression 15]}$$

In this expression, r8 is a radius of curvature of an image-side surface of the fourth lens, and f is the overall focal length of the optical system.

The optical system, according to embodiments, satisfies Conditional Expression 16.

$$FOV>80 \quad \text{[Conditional Expression 16]}$$

In this expression, FOV is a field of view of the optical system. In one illustrative example, the field of view of the optical system is indicated by degrees.

The optical system, according to embodiments, satisfies Conditional Expression 17.

$$FNO<2.2 \quad \text{[Conditional Expression 17]}$$

In this expression, FNO is an inverse number of an aperture ratio of the optical system. The aperture ratio of the optical system is 'a diameter of the stop/the overall focal length of the optical system'.

The smaller the FNO, the brighter an image by the optical system.

Next, the first to fifth lenses configuring the optical system, according to embodiments, will be described.

The first lens has a negative refractive power. In addition, the first lens has a meniscus shape with the object-side surface being convex. For example, a first surface of the first lens is convex in the paraxial region, and a second surface of the first lens is concave in the paraxial region.

At least one of the first and second surfaces of the first lens is aspherical. For example, two surfaces of the first lens are aspherical.

The second lens has a positive refractive power. In addition, at least one of the first and the second surfaces of the second lens is convex. For example, first and second surfaces of the second lens are convex in the paraxial region.

At least one of the first and second surfaces of the second lens is aspherical. For example, the first and the second surfaces of the second lens are aspherical.

The third lens has a negative refractive power. In addition, at least one of the first and second surfaces of the third lens is concave. For example, first and second surfaces of the third lens are concave in the paraxial region.

At least one of the first and second surfaces of the third lens is aspherical. For example, the first and the second surfaces of the third lens are aspherical. In an alternative configuration, the first surface of the third lens is substantially flat.

The fourth lens has a positive refractive power. In addition, the fourth lens has a meniscus shape of which an image-side surface is convex. For example, a first surface of the fourth lens is concave in the paraxial region, and a second surface of the fourth lens is convex in the paraxial region. In one example, end portions of the first surface of the fourth lens are substantially flat.

At least one of the first and second surfaces of the fourth lens is aspherical. For example, the first and the second surfaces of the fourth lens are aspherical.

The fifth lens has a positive refractive power. In addition, the fifth lens has a meniscus shape of which an object-side surface is convex. For example, a first surface of the fifth lens is convex in the paraxial region, and a second surface of the fifth lens is concave in the paraxial region.

At least one of the first and second surfaces of the fifth lens is aspherical. For example, two surfaces of the fifth lens may be aspherical.

In addition, at least one inflection point is formed on at least one of the first and second surfaces of the fifth lens. For example, the first surface of the fifth lens is convex in the paraxial region and becomes concave at an edge thereof. Furthermore, the second surface of the fifth lens is concave in the paraxial region and becomes convex at an edge thereof.

In one example, the stop is disposed in front of the object-side surface of the first lens.

Further, the optical system configured, as described above, has a wide field of view, and produces brighter images.

Also, in one embodiment, each of the first through fifth lenses may be separate lenses configured as described above. A distance between lenses may vary. In another embodiment, at least one of the first through fifth lenses may be operatively connected or in contact with another one of the first through fifth lenses.

In a further alternative embodiment, two or more of the lenses of the first through fifth lenses may be configured as a group and in operative connection or contact with another lens. For instance, the first, second, and third lenses may be in contact with each other as a first group lens, while the fourth and fifth lenses are configured separate from each other and from the first group lens. In the alternative, the first, second, and third lenses may be in contact with each other as a first group lens, the fourth and the fifth lenses may be in contact with each other as a second group lens.

An optical system according to a first embodiment will be described with reference to FIGS. 1 through 4.

The optical system, according to the first embodiment includes a first lens 110, a second lens 120, a third lens 130, a fourth lens 140, and a fifth lens 150. The optical system further includes a stop (not shown), an infrared cut-off filter 160, and an image sensor 170.

As illustrated in Table 1, a focal length (f1) of the first lens 110 is −4.463 mm, a focal length (f2) of the second lens 120 is 1.37668 mm, a focal length (f3) of the third lens 130 is −2.6092 mm, a focal length (f4) of the fourth lens 140 is 7.52432 mm, a focal length (f5) of the fifth lens 150 is 75.3369 mm, and an overall focal length (f) of the optical system is 2.3999 mm.

Further, a distance (OAL) from an object-side surface of the first lens 110 to an imaging surface of the image sensor 170 is 4.970 mm, and a distance (BFL) from an image-side surface of the fifth lens 150 to the imaging surface of the image sensor 170 is 0.931 mm.

TABLE 1

| | |
|---|---|
| f | 2.3999 |
| f1 | −4.463 |
| f2 | 1.376677 |
| f3 | −2.6092 |
| f4 | 7.524322 |
| f5 | 75.33687 |
| v1 | 56.1 |
| v2 | 56.1 |
| v3 | 23.5 |
| v4 | 56.1 |
| v5 | 23.5 |
| OAL | 4.970 |
| BFL | 0.931 |

In this example, respective characteristics, such as radii of curvature, thicknesses, refractive indices, and Abbe numbers, of lenses are illustrated in FIG. 3.

In the first embodiment, the first lens 110 has a negative refractive power, and has a meniscus shape of which the object-side surface is convex. For example, a first surface of the first lens 110 is convex, at least, in the paraxial region, and a second surface of the first lens 110 is concave, at least, in the paraxial region.

The second lens 120 has a positive refractive power, and has a meniscus shape of which two surfaces are convex. For example, first and second surfaces of the second lens 120 are convex, at least, in the paraxial region.

The third lens 130 has a negative refractive power and may have two surfaces which are concave. For example, first and second surfaces of the third lens 130 are concave, at least, in the paraxial region.

The fourth lens 140 has a positive refractive power, and has a meniscus shape of which an image-side surface is convex. For example, a first surface of the fourth lens 140 is concave, at least, in the paraxial region, and a second surface of the fourth lens 140 is convex, at least, in the paraxial region.

The fifth lens 150 has a positive refractive power, and has a meniscus shape of which an object-side surface is convex. For example, a first surface of the fifth lens 150 is convex, at least, in the paraxial region, and a second surface of the fifth lens 150 is concave, at least, in the paraxial region. In addition, the fifth lens 150 has at least one inflection point formed on at least one of the first and second surfaces thereof.

Furthermore, the respective surfaces of the first to fifth lenses 110 to 150 have aspherical surface coefficients as illustrated in FIG. 4. However, persons skilled in the art will appreciate that some variation in the aspherical surface coefficients may exist without departing from the results and benefits of the embodiment.

In one example, the stop is positioned in front of the object-side surface of the first lens 110.

Figure 2:
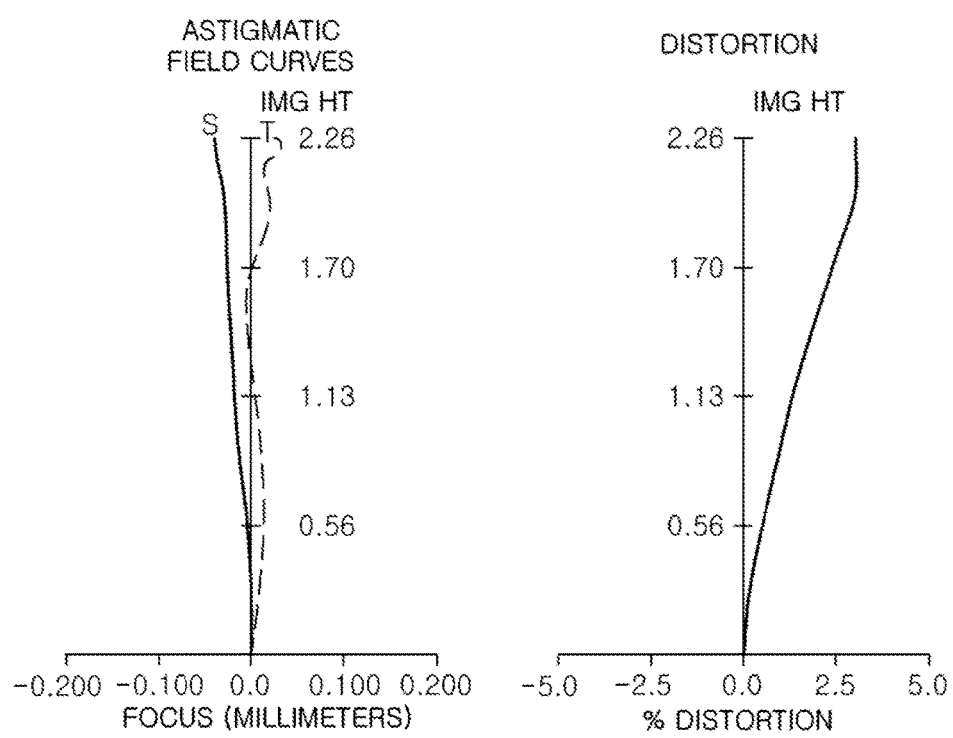
FIG. 2 is graphs having curves illustrating aberration characteristics of the optical system illustrated in FIG. 1.
Figure 5:
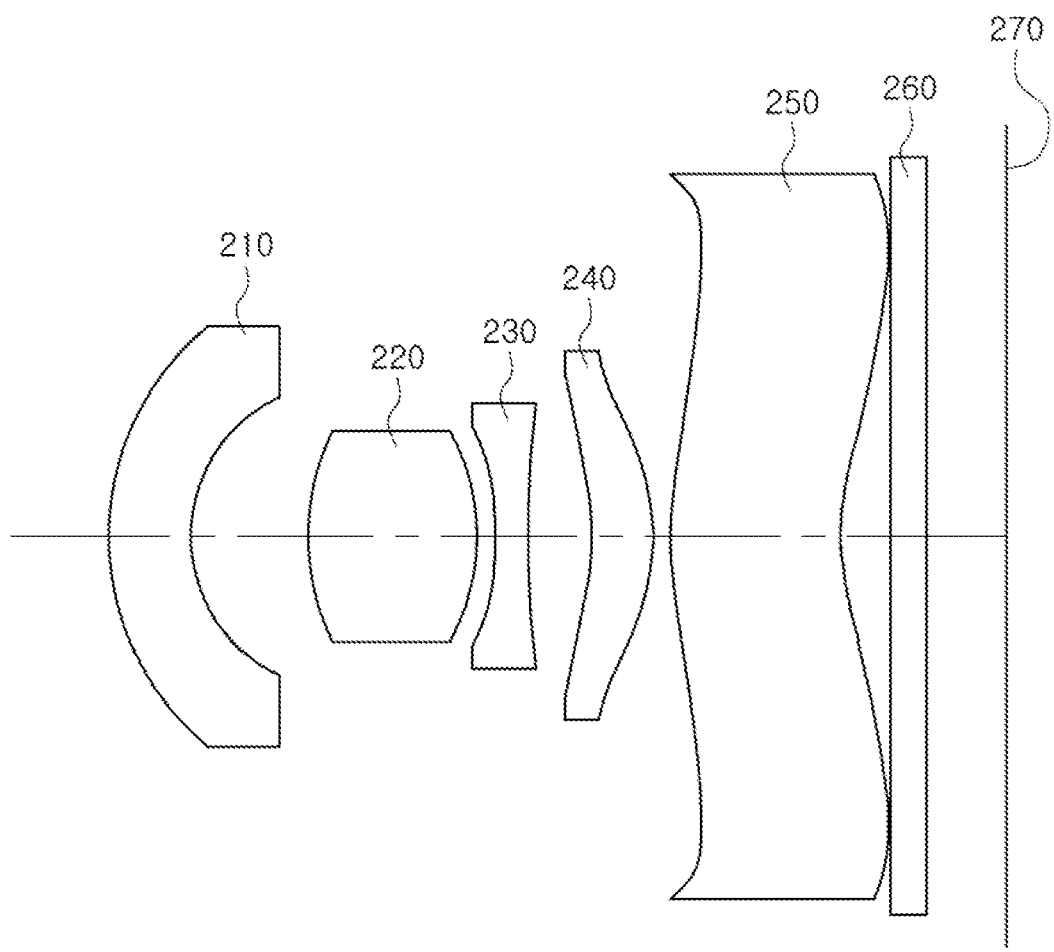
FIG. 5 is a view of an optical system, according to a second embodiment.

In addition, the optical system configured as described above has aberration characteristics as illustrated in FIG. 2. However, persons skilled in the art will appreciate that some variation in the aberration characteristics may exist without departing from the results and benefits of the first embodiment.

An optical system, according to a second embodiment, will be described with reference to FIGS. 5 through 8.

The optical system, according to the second embodiment, includes a first lens 210, a second lens 220, a third lens 230, a fourth lens 240, and a fifth lens 250. The optical system also includes a stop, an infrared cut-off filter 260, and an image sensor 270.

As illustrated in Table 2, a focal length (f1) of the first lens 210 is −4.524 mm, a focal length (f2) of the second lens 220 is 1.37888 mm, a focal length (f3) of the third lens 230 is −2.6047 mm, a focal length (f4) of the fourth lens 240 is 7.57749 mm, a focal length (f5) of the fifth lens 250 is 1878.49 mm, and an overall focal length (f) of the optical system is 2.4 mm.

Further, a distance (OAL) from an object-side surface of the first lens 210 to an imaging surface of the image sensor 270 is 4.970 mm, and a distance (BFL) from an image-side surface of the fifth lens 250 to the imaging surface of the image sensor 270 is 0.915 mm.

TABLE 2

| | |
|---|---|
| f | 2.4 |
| f1 | −4.524 |
| f2 | 1.378883 |
| f3 | −2.6047 |
| f4 | 7.577489 |
| f5 | 1878.492 |
| v1 | 56.1 |
| v2 | 56.1 |
| v3 | 23.5 |
| v4 | 56.1 |
| v5 | 23.5 |
| OAL | 4.970 |
| BFL | 0.915 |

In this example, respective characteristics (radii of curvature, thicknesses, refractive indices, and Abbe numbers) of lenses are illustrated in FIG. 7.

In the second embodiment, the first lens 210 has a negative refractive power, and has a meniscus shape of which an object-side surface is convex. For example, a first surface of the first lens 210 is convex, at least, in the paraxial region, and a second surface of the first lens 210 is concave, at least, in the paraxial region.

The second lens 220 has a positive refractive power, and has a meniscus shape of which two surfaces are convex. For example, first and second surfaces of the second lens 220 are convex, at least, in the paraxial region.

The third lens 230 has a negative refractive power and has two surfaces which are concave. For example, first and second surfaces of the third lens 230 are concave, at least, in the paraxial region.

The fourth lens 240 has a positive refractive power, and has a meniscus shape of which an image-side surface is convex. For example, a first surface of the fourth lens 240 is concave, at least, in the paraxial region, and a second surface of the fourth lens 240 is convex, at least, in the paraxial region.

The fifth lens 250 has a positive refractive power, and has a meniscus shape of which an object-side surface is convex. For example, a first surface of the fifth lens 250 is convex, at least, in the paraxial region, and a second surface of the fifth lens 250 is concave, at least, in the paraxial region. In addition, the fifth lens 250 has at least one inflection point formed on at least one of the first and second surfaces thereof.

Further, the respective surfaces of the first to fifth lenses 210 to 250 have aspherical surface coefficients as illustrated in FIG. 8. However, persons skilled in the art will appreciate that some variation in the aspherical surface coefficients may exist without departing from the results and benefits of the embodiment.

In addition, the stop is disposed in front of the object-side surface of the first lens 210.

Figure 6:
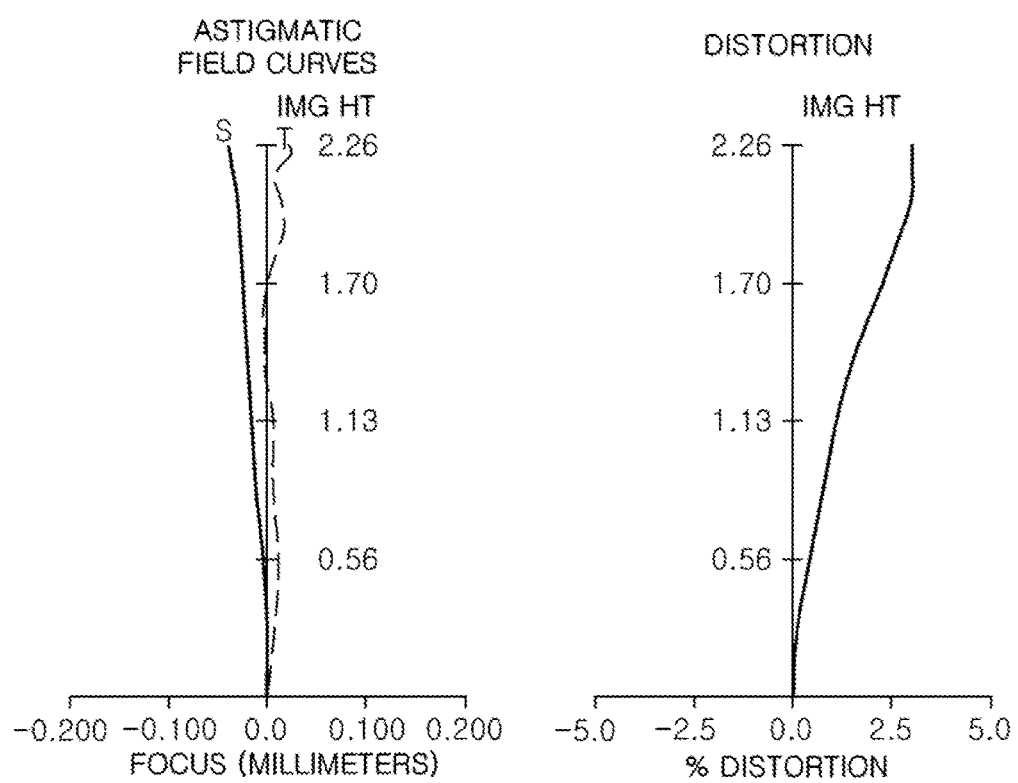
FIG. 6 is graphs having curves illustrating aberration characteristics of the optical system illustrated in FIG. 5.
Figure 9:
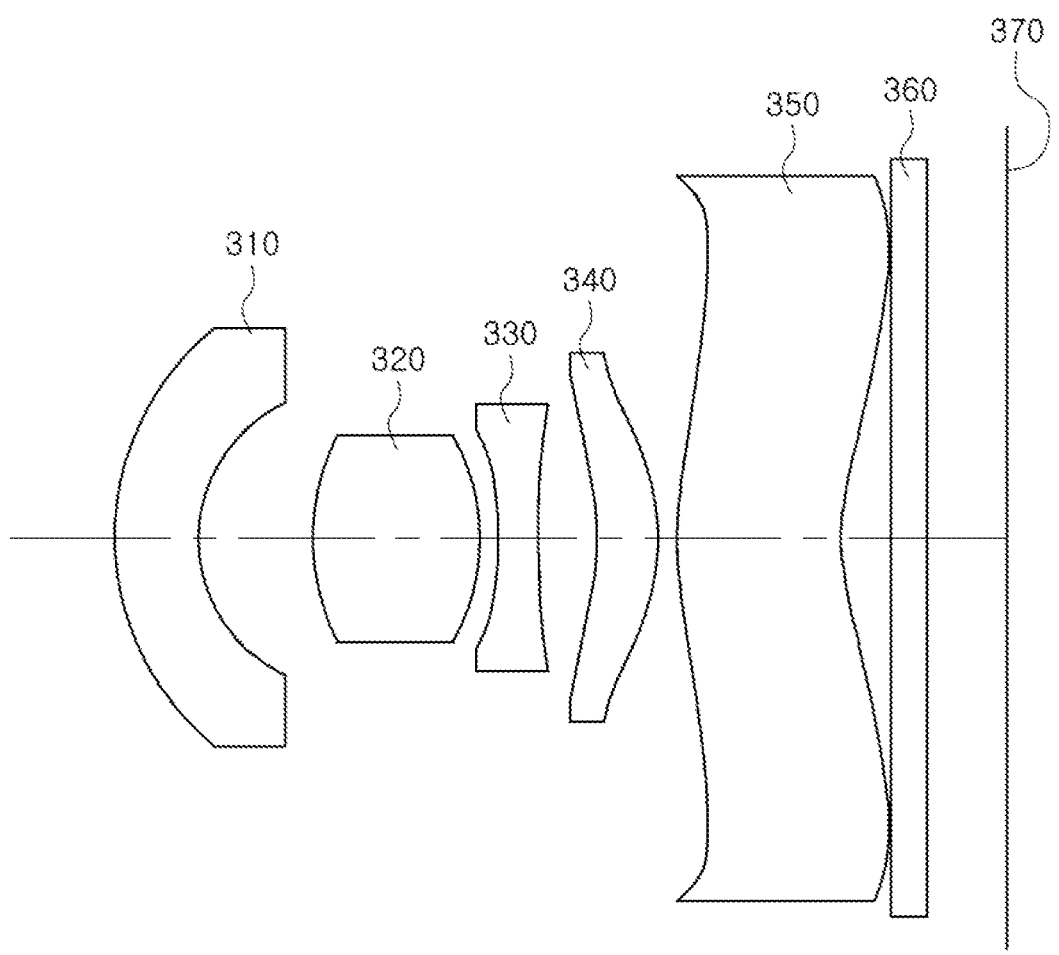
FIG. 9 is a view of an optical system, according to a third embodiment.

In addition, the optical system configured as described above may have aberration characteristics as illustrated in FIG. 6. However, persons skilled in the art will appreciate that some variation in the aberration characteristics may exist without departing from the results and benefits of the embodiment.

An optical system according to a third embodiment will be described with reference to FIGS. 9 through 12.

The optical system, according to the third embodiment, may include a first lens 310, a second lens 320, a third lens 330, a fourth lens 340, and a fifth lens 350. The optical system also includes a stop, an infrared cut-off filter 360, and an image sensor 370.

As illustrated in Table 3, a focal length (f1) of the first lens 310 is −4.3907 mm, a focal length (f2) of the second lens 320 is 1.35421 mm, a focal length (f3) of the third lens 330 is −2.5297 mm, a focal length (f4) of the fourth lens 340 is 7.20756 mm, a focal length (f5) of the fifth lens 350 is 5493.18 mm, and an overall focal length (f) of the optical system is 2.3685 mm.

Further, a distance (OAL) from an object-side surface of the first lens 310 to an imaging surface of the image sensor 370 is 4.925 mm, and a distance (BFL) from an image-side surface of the fifth lens 350 to the imaging surface of the image sensor 370 is 0.915 mm.

TABLE 3

| | |
|---|---|
| f | 2.3685 |
| f1 | −4.3907 |
| f2 | 1.354205 |
| f3 | −2.5297 |
| f4 | 7.207562 |
| f5 | 5493.179 |
| v1 | 56.1 |
| v2 | 56.1 |
| v3 | 23.5 |
| v4 | 56.1 |
| v5 | 23.5 |
| OAL | 4.925 |
| BFL | 0.915 |

In this example, respective characteristics, such as radii of curvature, thicknesses, refractive indices, and Abbe numbers, of lenses are illustrated in FIG. 11.

In the third embodiment, the first lens 310 has a negative refractive power, and has a meniscus shape of which an object-side surface is convex. For example, a first surface of the first lens 310 is convex, at least, in the paraxial region, and a second surface of the first lens 310 is concave, at least, in the paraxial region.

The second lens 320 has a positive refractive power, and has a meniscus shape of which two surfaces are convex. For example, first and second surfaces of the second lens 320 are convex, at least, in the paraxial region.

The third lens 330 has a negative refractive power and has two surfaces which are concave. For example, first and second surfaces of the third lens 330 are concave, at least, in the paraxial region.

The fourth lens 340 has a positive refractive power, and has a meniscus shape of which an image-side surface is convex. For example, a first surface of the fourth lens 340 is concave, at least, in the paraxial region, and a second surface of the fourth lens 340 is convex, at least, in the paraxial region.

The fifth lens 350 has a positive refractive power, and has a meniscus shape of which an object-side surface is convex.

For example, a first surface of the fifth lens 350 is convex, at least, in the paraxial region, and a second surface of the fifth lens 350 is concave, at least, in the paraxial region. In addition, the fifth lens 350 has at least one inflection point formed on at least one of the first and second surfaces thereof.

Further, the respective surfaces of the first to fifth lenses 310 to 350 have aspherical surface coefficients as illustrated in FIG. 12. However, persons skilled in the art will appreciate that some variation in the aspherical surface coefficients may exist without departing from the results and benefits of the embodiment.

In addition, the stop is disposed in front of the object-side surface of the first lens 310.

Figure 10:
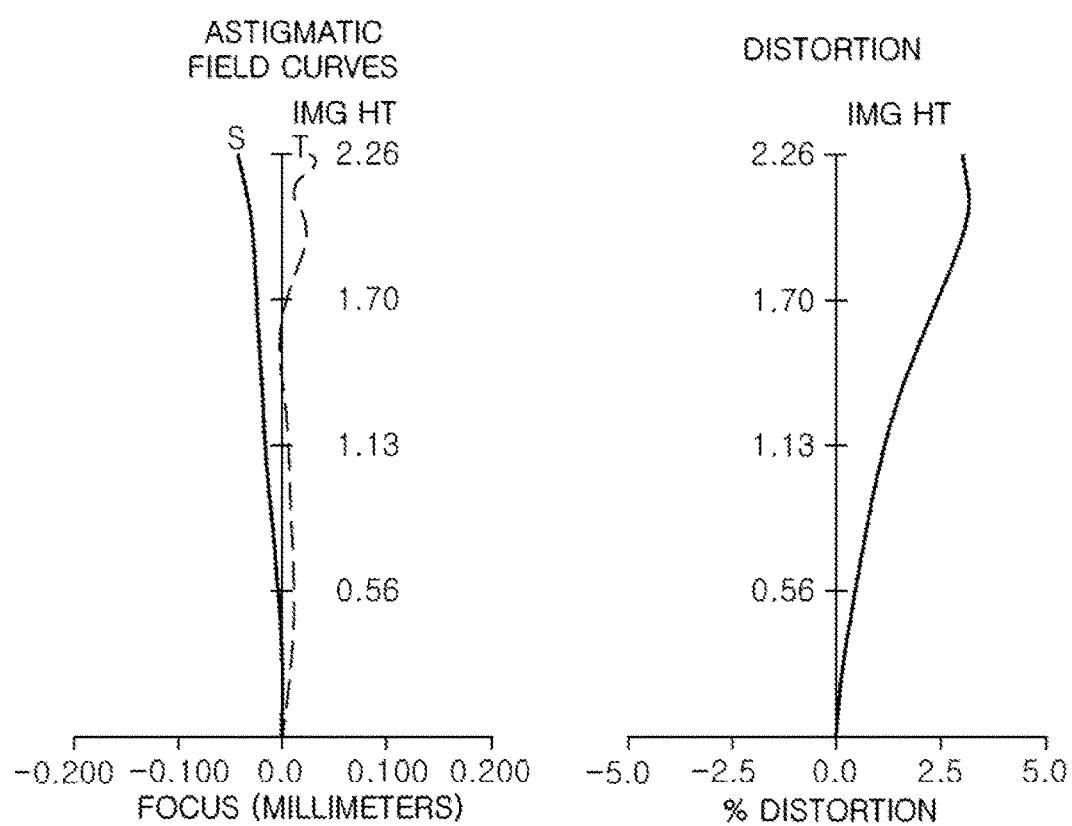
FIG. 10 is graphs having curves illustrating aberration characteristics of the optical system illustrated in FIG. 9.
Figure 13:
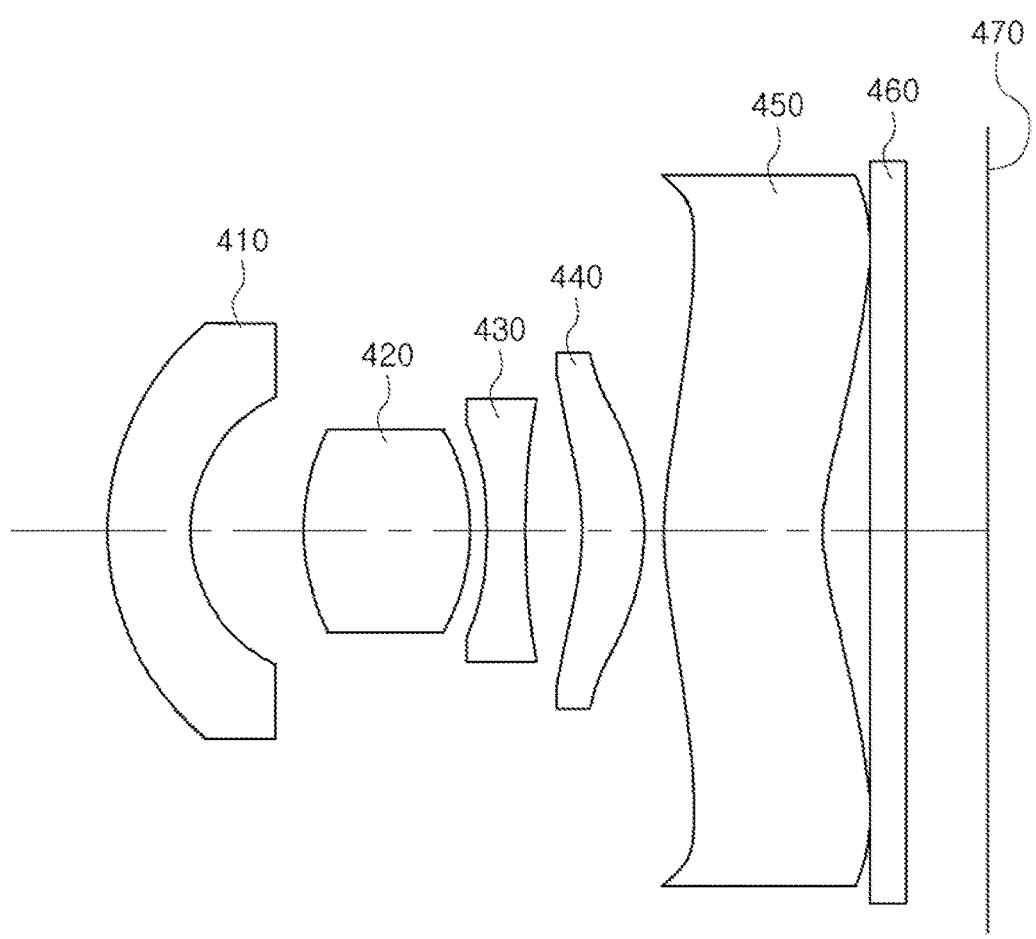
FIG. 13 is a view of an optical system, according to a fourth embodiment.

In addition, the optical system configured as described above has aberration characteristics as illustrated in FIG. 10. However, persons skilled in the art will appreciate that some variation in the aberration characteristics may exist without departing from the results and benefits of the embodiment.

An optical system according to a fourth embodiment will be described with reference to FIGS. 13 through 16.

The optical system, according to the fourth embodiment, includes a first lens 410, a second lens 420, a third lens 430, a fourth lens 440, and a fifth lens 450. The optical system also includes a stop, an infrared cut-off filter 460, and an image sensor 470.

As illustrated in Table 4, a focal length (f1) of the first lens 410 is −4.4528 mm, a focal length (f2) of the second lens 420 is 1.37069 mm, a focal length (f3) of the third lens 430 is −2.5788 mm, a focal length (f4) of the fourth lens 440 is 7.28033 mm, a focal length (f5) of the fifth lens 450 is 509.557 mm, and an overall focal length (f) of the optical system is 2.4 mm.

Further, a distance (OAL) from an object-side surface of the first lens 410 to an imaging surface of the image sensor 470 is 4.971 mm, and a distance (BFL) from an image-side surface of the fifth lens 450 to the imaging surface of the image sensor 470 is 0.924 mm.

TABLE 4

| | |
|---|---|
| f | 2.4 |
| f1 | −4.4528 |
| f2 | 1.370692 |
| f3 | −2.5788 |
| f4 | 7.28033 |
| f5 | 509.5573 |
| v1 | 56.1 |
| v2 | 56.1 |
| v3 | 23.5 |
| v4 | 56.1 |
| v5 | 23.5 |
| OAL | 4.971 |
| BFL | 0.924 |

In this example, respective characteristics, such as radii of curvature, thicknesses of lenses or distances between the lenses, refractive indices, and Abbe numbers, of lenses are illustrated in FIG. 15.

In the fourth embodiment, the first lens 410 has a negative refractive power, and has a meniscus shape of which an object-side surface is convex. For example, a first surface of the first lens 410 is convex, at least, in the paraxial region, and a second surface of the first lens 410 is concave, at least, in the paraxial region.

The second lens 420 has a positive refractive power, and has a meniscus shape of which two surfaces are convex. For example, first and second surfaces of the second lens 420 are convex, at least, in the paraxial region.

The third lens 430 has a negative refractive power and has two surfaces that are concave. For example, first and second surfaces of the third lens 430 are concave, at least, in the paraxial region.

The fourth lens 440 has a positive refractive power, and has a meniscus shape of which an image-side surface is convex. For example, a first surface of the fourth lens 440 is concave, at least, in the paraxial region, and a second surface of the fourth lens 440 is convex, at least, in the paraxial region.

The fifth lens 450 has a positive refractive power, and has a meniscus shape of which an object-side surface is convex. For example, a first surface of the fifth lens 450 is convex, at least, in the paraxial region, and a second surface of the fifth lens 450 is concave, at least, in the paraxial region. In addition, the fifth lens 450 has at least one inflection point formed on at least one of the first and second surfaces thereof.

Further, the respective surfaces of the first to fifth lenses 410 to 450 have aspherical surface coefficients as illustrated in FIG. 16. However, persons skilled in the art will appreciate that some variation in the aspherical surface coefficients may exist without departing from the results and benefits of the embodiment.

In addition, the stop is disposed in front of the object-side surface of the first lens 410.

Figure 14:
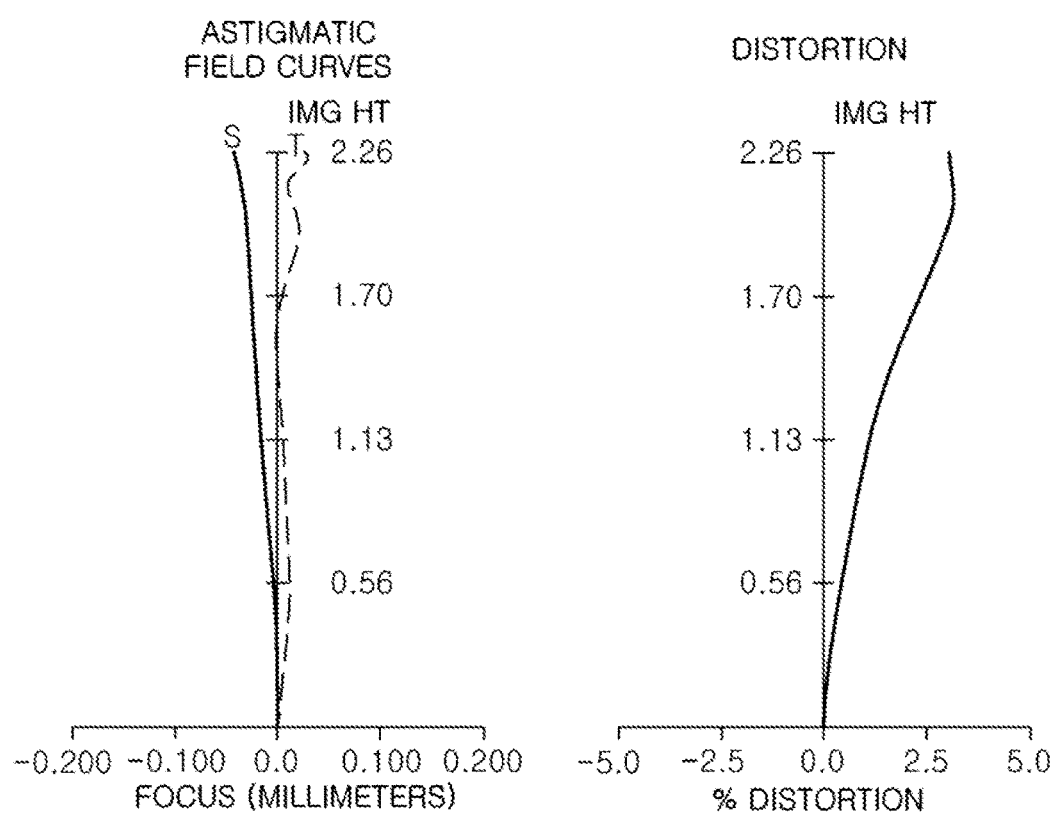
FIG. 14 is graphs having curves illustrating aberration characteristics of the optical system illustrated in FIG. 13.
Figure 17:
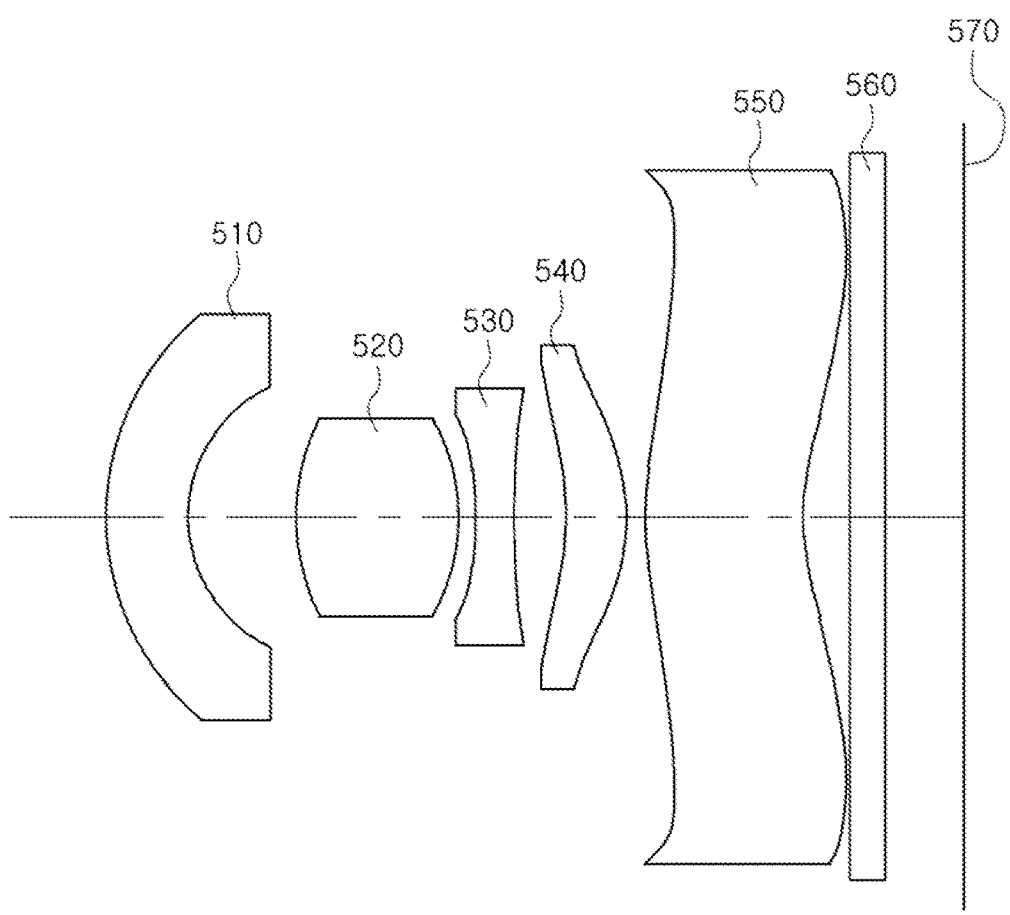
FIG. 17 is a view of an optical system, according to a fifth embodiment.

In addition, the optical system configured as described above has aberration characteristics as illustrated in FIG. 14. However, persons skilled in the art will appreciate that some variation in the aberration characteristics may exist without departing from the results and benefits of the embodiment.

An optical system, according to a fifth embodiment, will be described with reference to FIGS. 17 through 20.

The optical system, according to the fifth embodiment, includes a first lens 510, a second lens 520, a third lens 530, a fourth lens 540, and a fifth lens 550. The optical system also includes a stop, an infrared cut-off filter 560, and an image sensor 570.

As illustrated in Table 5, a focal length (f1) of the first lens 510 is −4.5045 mm, a focal length (f2) of the second lens 520 is 1.36938 mm, a focal length (f3) of the third lens 530 is −2.5479 mm, a focal length (f4) of the fourth lens 540 is 7.29404 mm, a focal length (f5) of the fifth lens 550 is 115.841 mm, and an overall focal length (f) of the optical system is 2.4 mm.

Further, a distance (OAL) from an object-side surface of the first lens 510 to an imaging surface of the image sensor 570 is 4.971 mm, and a distance (BFL) from an image-side surface of the fifth lens 550 to the imaging surface of the image sensor 570 is 0.925 mm.

TABLE 5

| f | 2.4 |
|---|---|
| f1 | −4.5045 |
| f2 | 1.369378 |
| f3 | −2.5479 |
| f4 | 7.294039 |
| f5 | 115.8407 |
| v1 | 56.1 |
| v2 | 56.1 |
| v3 | 23.5 |
| v4 | 56.1 |
| v5 | 23.5 |
| OAL | 4.971 |
| BFL | 0.925 |

In this example, respective characteristics, such as radii of curvature, thicknesses of lenses or distances between the lenses, refractive indices, and Abbe numbers, of lenses are illustrated in FIG. 19.

In the fifth embodiment, the first lens 510 has a negative refractive power, and has a meniscus shape of which an object-side surface is convex. For example, a first surface of the first lens 510 is convex, at least, in the paraxial region, and a second surface of the first lens 510 is concave, at least, in the paraxial region.

The second lens 520 has a positive refractive power, and has a meniscus shape of which two surfaces are convex. For example, first and second surfaces of the second lens 520 are convex, at least, in the paraxial region.

The third lens 530 has a negative refractive power and has two surfaces which are concave. For example, first and second surfaces of the third lens 530 are concave, at least, in the paraxial region.

The fourth lens 540 has a positive refractive power, and has a meniscus shape of which an image-side surface is convex. For example, a first surface of the fourth lens 540 is concave, at least, in the paraxial region, and a second surface of the fourth lens 540 is convex, at least, in the paraxial region.

The fifth lens 550 has a positive refractive power, and has a meniscus shape of which an object-side surface is convex. For example, a first surface of the fifth lens 550 is convex, at least, in the paraxial region, and a second surface of the fifth lens 550 is concave, at least, in the paraxial region. In addition, the fifth lens 550 has at least one inflection point formed on at least one of the first and second surfaces thereof.

Further, the respective surfaces of the first to fifth lenses 510 to 550 have aspherical surface coefficients as illustrated in FIG. 20. However, persons skilled in the art will appreciate that some variation in the aspherical surface coefficients may exist without departing from the results and benefits of the embodiment.

In addition, the stop is disposed in front of the object-side surface of the first lens 510.

Figure 18:
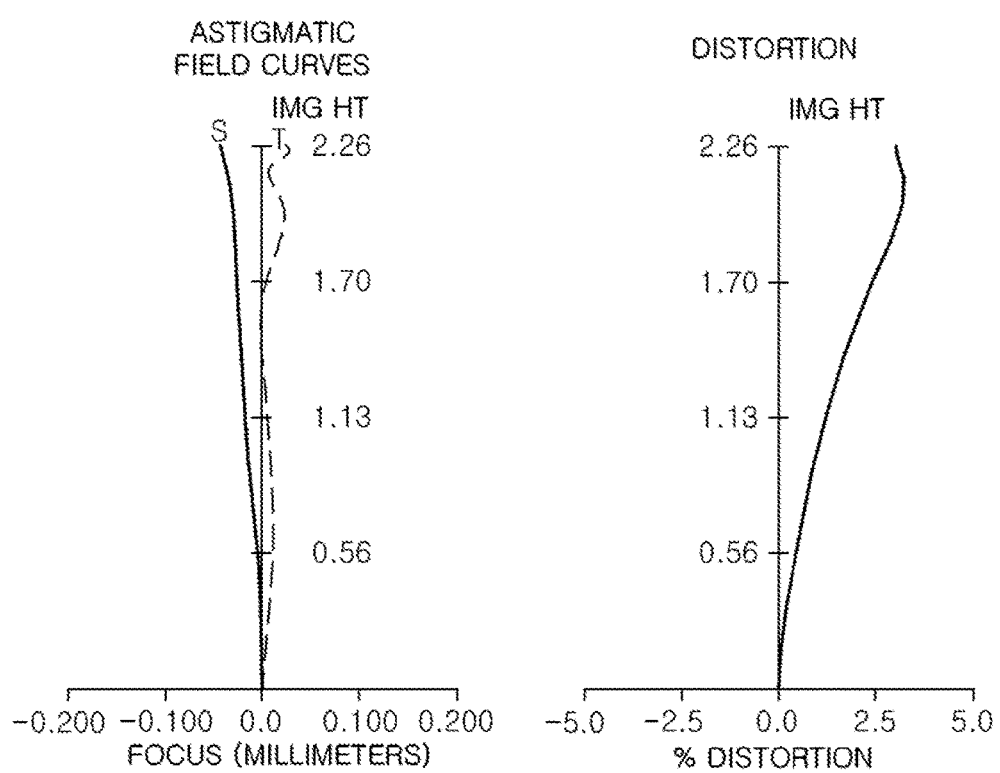
FIG. 18 is graphs having curves illustrating aberration characteristics of the optical system illustrated in FIG. 17.
Figure 21:
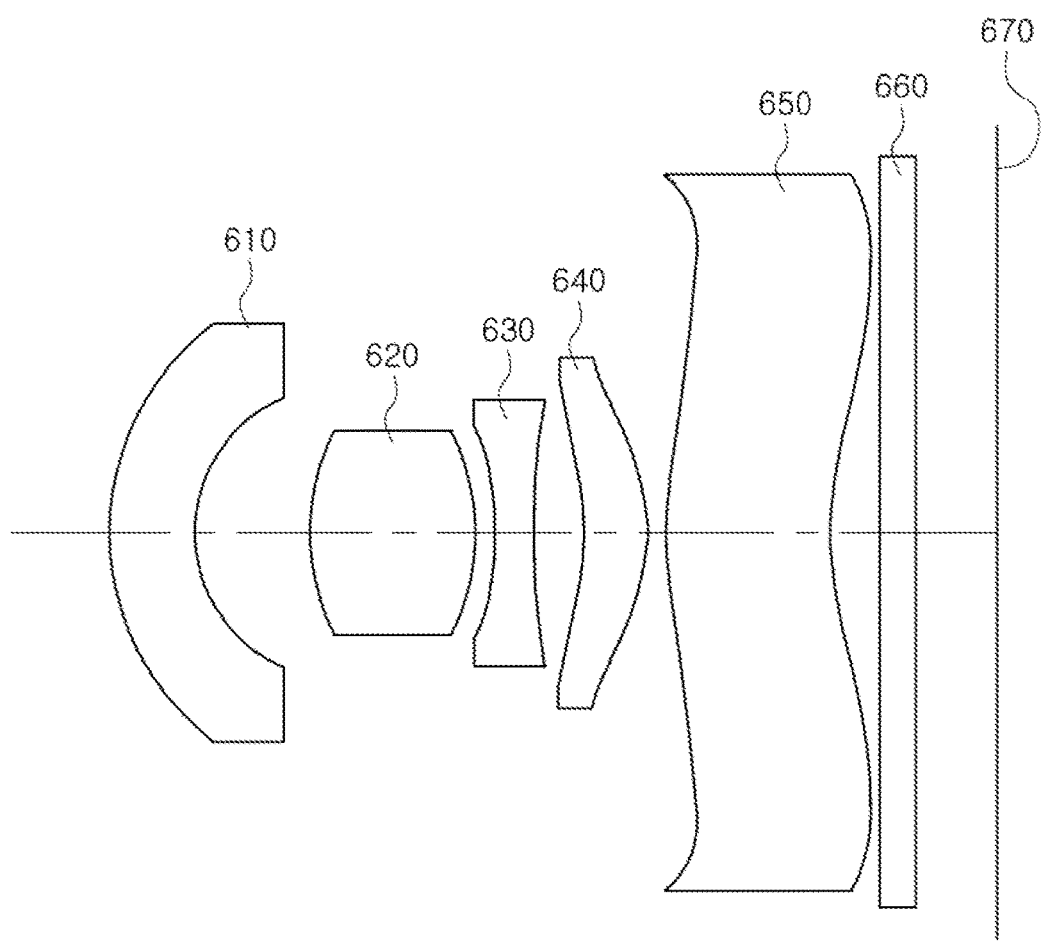
FIG. 21 is a view of an optical system, according to a sixth embodiment.

In addition, the optical system configured as described above has aberration characteristics as illustrated in FIG. 18. However, persons skilled in the art will appreciate that some variation in the aberration characteristics may exist without departing from the results and benefits of the embodiment.

An optical system according to a sixth embodiment will be described with reference to FIGS. 21 through 24.

The optical system, according to the sixth embodiment, includes a first lens 610, a second lens 620, a third lens 630, a fourth lens 640, and a fifth lens 650. The optical system also includes a stop, an infrared cut-off filter 660, and an image sensor 670.

As illustrated in Table 6, a focal length (f1) of the first lens 610 is −4.539 mm, a focal length (f2) of the second lens 620 is 1.36576 mm, a focal length (f3) of the third lens 630 is −2.5133 mm, a focal length (f4) of the fourth lens 640 is 7.18089 mm, a focal length (f5) of the fifth lens 650 is 70.5881 mm, and an overall focal length (f) of the optical system is 2.4 mm.

Further, a distance (OAL) from an object-side surface of the first lens 610 to an imaging surface of the image sensor 670 is 4.971 mm, and a distance (BFL) from an image-side surface of the fifth lens 650 to the imaging surface of the image sensor 670 is 0.936 mm.

TABLE 6

| f | 2.4 |
|---|---|
| f1 | −4.539 |
| f2 | 1.36576 |
| f3 | −2.5133 |
| f4 | 7.180889 |
| f5 | 70.58813 |
| v1 | 56.1 |
| v2 | 56.1 |
| v3 | 23.5 |
| v4 | 56.1 |
| v5 | 23.5 |
| OAL | 4.971 |
| BFL | 0.936 |

In this example, respective characteristics, such as radii of curvature, thicknesses, refractive indices, and Abbe numbers, of lenses are illustrated in FIG. 23.

In the sixth embodiment, the first lens 610 has a negative refractive power, and has a meniscus shape of which an object-side surface is convex. For example, a first surface of the first lens 610 is convex, at least, in the paraxial region, and a second surface of the first lens 610 is concave, at least, in the paraxial region.

The second lens 620 has a positive refractive power, and has a meniscus shape of which two surfaces are convex. For example, first and second surfaces of the second lens 620 are convex, at least, in the paraxial region.

The third lens 630 has a negative refractive power and has two surfaces that are concave. For example, first and second surfaces of the third lens 630 are concave, at least, in the paraxial region.

The fourth lens 640 has a positive refractive power, and has a meniscus shape of which an image-side surface is convex. For example, a first surface of the fourth lens 640 is concave, at least, in the paraxial region, and a second surface of the fourth lens 640 is convex, at least, in the paraxial region.

The fifth lens 650 has a positive refractive power, and has a meniscus shape of which an object-side surface is convex. For example, a first surface of the fifth lens 650 is convex, at least, in the paraxial region, and a second surface of the fifth lens 650 is concave, at least, in the paraxial region. In addition, the fifth lens 650 has at least one inflection point formed on at least one of the first and second surfaces thereof.

Further, the respective surfaces of the first to fifth lenses 610 to 650 have aspherical surface coefficients as illustrated in FIG. 24. However, persons skilled in the art will appreciate that some variation in the aspherical surface coefficients may exist without departing from the results and benefits of the embodiment.

In addition, the stop is disposed in front of the object-side surface of the first lens 610.

Figure 22:
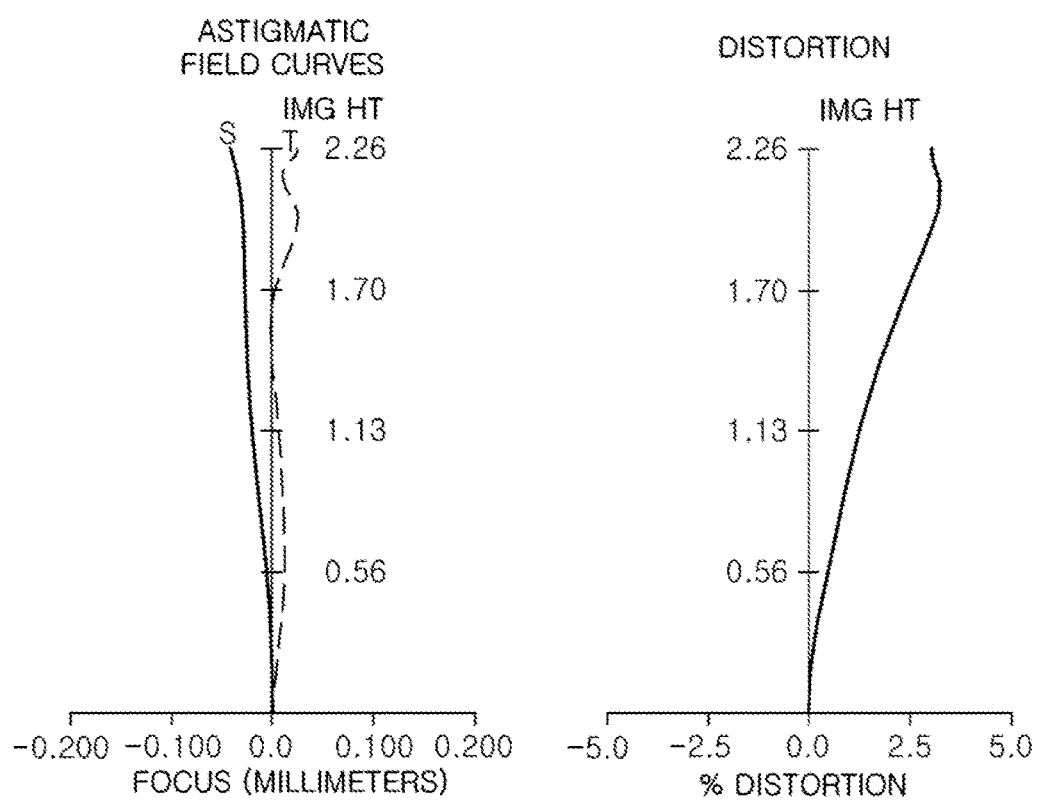
FIG. 22 is graphs having curves illustrating aberration characteristics of the optical system illustrated in FIG. 21.
Figure 25:
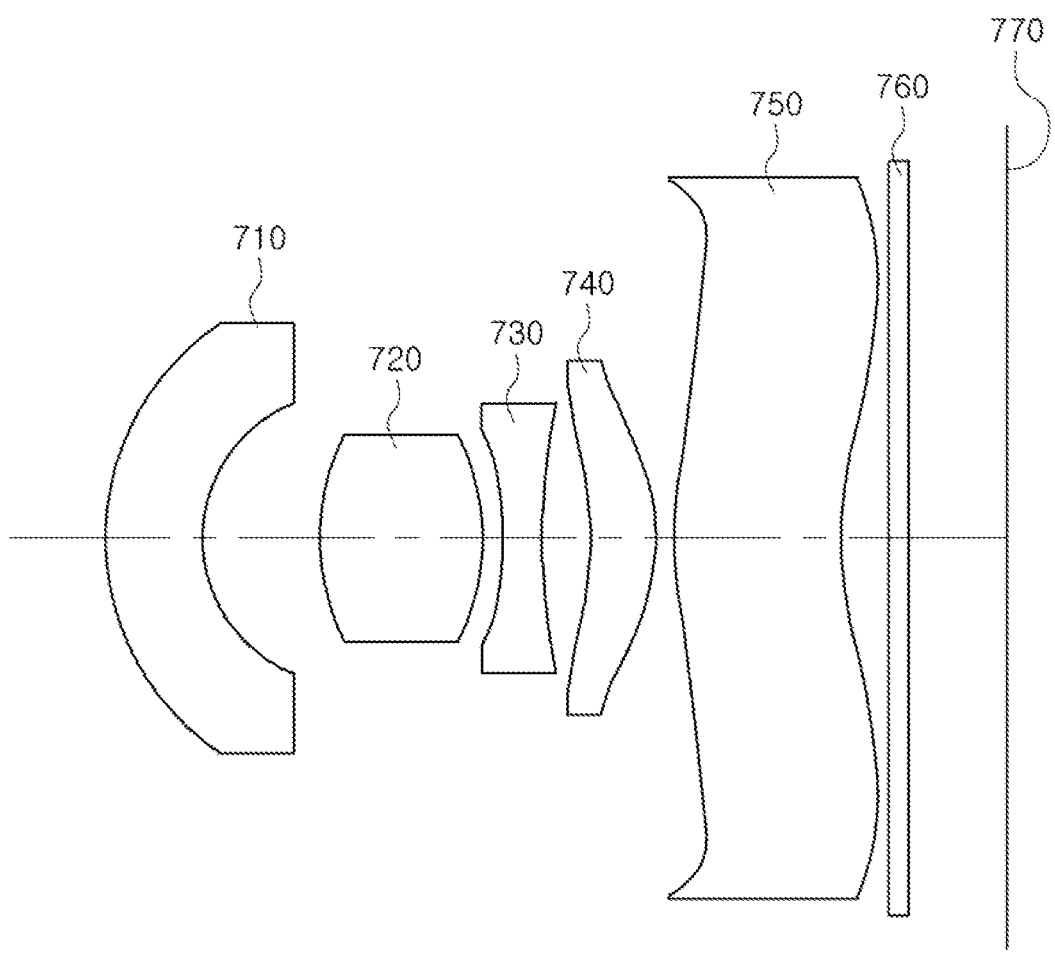
FIG. 25 is a view of an optical system, according to a seventh embodiment.

In addition, the optical system configured as described above has aberration characteristics as illustrated in FIG. 22. However, persons skilled in the art will appreciate that some variation in the aberration characteristics may exist without departing from the results and benefits of the embodiment.

An optical system according to a seventh embodiment will be described with reference to FIGS. 25 through 28.

The optical system, according to the seventh embodiment, includes a first lens 710, a second lens 720, a third lens 730, a fourth lens 740, and a fifth lens 750. The optical system also includes a stop, an infrared cut-off filter 760, and an image sensor 770.

As illustrated in Table 7, a focal length (f1) of the first lens 710 is −4.6117 mm, a focal length (f2) of the second lens 720 is 1.3626 mm, a focal length (f3) of the third lens 730 is −2.4673 mm, a focal length (f4) of the fourth lens 740 is 6.6595 mm, a focal length (f5) of the fifth lens 750 is 51.8561 mm, and an overall focal length (f) of the optical system is 2.4 mm.

Further, a distance (OAL) from an object-side surface of the first lens 710 to an imaging surface of the image sensor 770 is 4.971 mm, and a distance (BFL) from an image-side surface of the fifth lens 750 to the imaging surface of the image sensor 770 is 0.916 mm.

TABLE 7

| f | 2.4 |
|---|---|
| f1 | −4.6117 |
| f2 | 1.362602 |
| f3 | −2.4673 |
| f4 | 6.659498 |
| f5 | 51.85608 |
| v1 | 56.1 |
| v2 | 56.1 |
| v3 | 23.5 |
| v4 | 56.1 |
| v5 | 23.5 |
| OAL | 4.971 |
| BFL | 0.916 |

In this example, respective characteristics, such as radii of curvature, thicknesses, refractive indices, and Abbe numbers, of lenses are illustrated in FIG. 27.

In the seventh embodiment, the first lens 710 has a negative refractive power, and has a meniscus shape of which an object-side surface is convex. For example, a first surface of the first lens 710 is convex, at least, in the paraxial region, and a second surface of the first lens 710 is concave, at least, in the paraxial region.

The second lens 720 has a positive refractive power, and has a meniscus shape of which two surfaces are convex. For example, first and second surfaces of the second lens 720 are convex, at least, in the paraxial region.

The third lens 730 has a negative refractive power and has two surfaces that are concave. For example, first and second surfaces of the third lens 730 are concave, at least, in the paraxial region.

The fourth lens 740 has a positive refractive power, and has a meniscus shape of which an image-side surface is convex. For example, a first surface of the fourth lens 740 is concave, at least, in the paraxial region, and a second surface of the fourth lens 740 is convex, at least, in the paraxial region.

The fifth lens 750 has a positive refractive power, and has a meniscus shape of which an object-side surface is convex. For example, a first surface of the fifth lens 750 is convex, at least, in the paraxial region, and a second surface of the fifth lens 750 is concave, at least, in the paraxial region. In addition, the fifth lens 750 has at least one inflection point formed on at least one of the first and second surfaces thereof.

Meanwhile, the respective surfaces of the first to fifth lenses 710 to 750 have aspherical surface coefficients as illustrated in FIG. 28. However, persons skilled in the art will appreciate that some variation in the aspherical surface coefficients may exist without departing from the results and benefits of the embodiment.

In addition, the stop is disposed in front of the object-side surface of the first lens 710.

Figure 26:
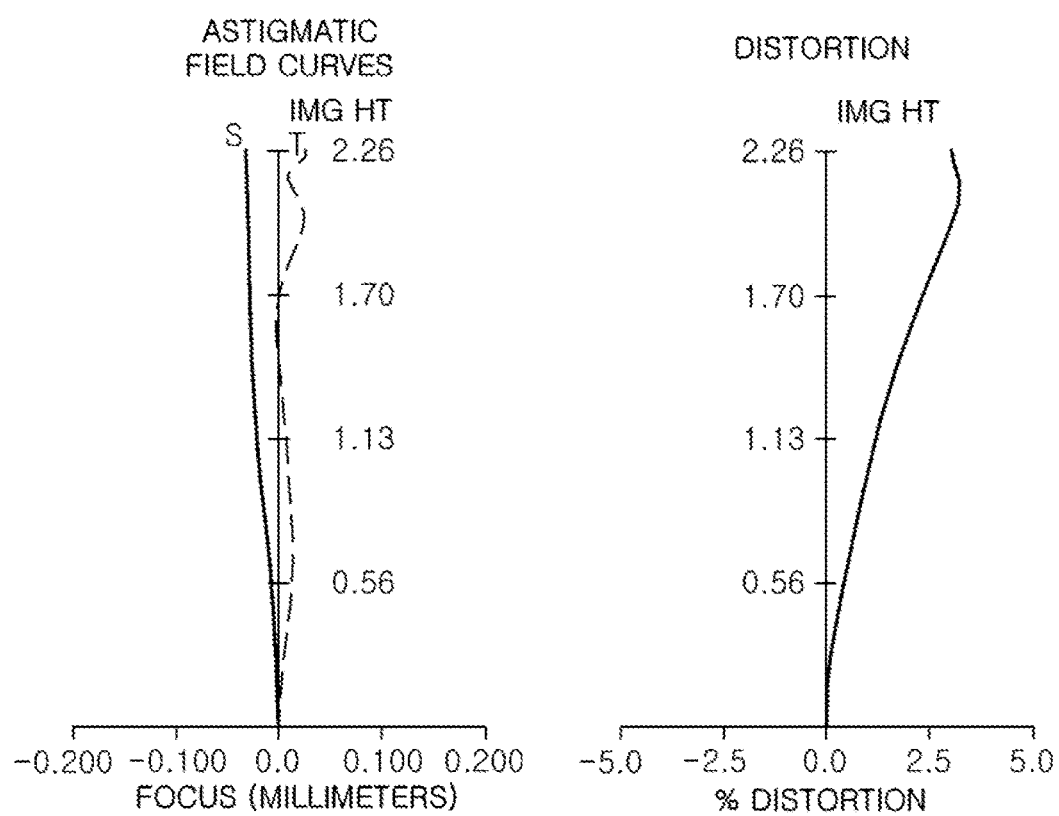
FIG. 26 is graphs having curves illustrating aberration characteristics of the optical system illustrated in FIG. 25.
Figure 29:
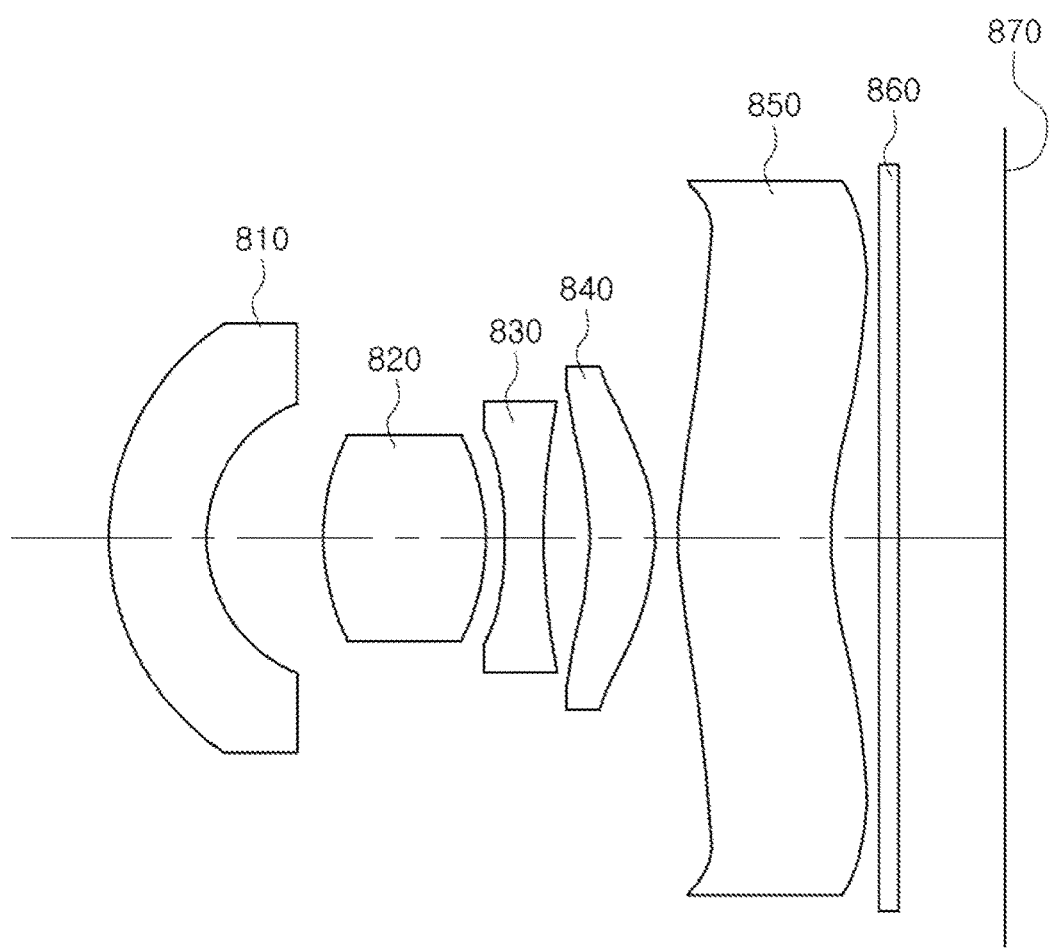
FIG. 29 is a view of an optical system, according to an eighth embodiment.

In addition, the optical system configured as described above has aberration characteristics as illustrated in FIG. 26. However, persons skilled in the art will appreciate that some variation in the aberration characteristics may exist without departing from the results and benefits of the embodiment.

An optical system according to an eighth embodiment will be described with reference to FIGS. 29 through 32.

The optical system, according to the eighth embodiment, includes a first lens 810, a second lens 820, a third lens 830, a fourth lens 840, and a fifth lens 850. The optical system also includes a stop, an infrared cut-off filter 860, and an image sensor 870.

As illustrated in Table 8, a focal length (f1) of the first lens 810 is −4.5835 mm, a focal length (f2) of the second lens 820 is 1.36287 mm, a focal length (f3) of the third lens 830 is −2.465 mm, a focal length (f4) of the fourth lens 840 is 6.12052 mm, a focal length (f5) of the fifth lens 850 is 70.0162 mm, and an overall focal length (f) of the optical system is 2.4 mm.

Further, a distance (OAL) from an object-side surface of the first lens 810 to an imaging surface of the image sensor 870 is 4.971 mm, and a distance (BFL) from an image-side surface of the fifth lens 850 to the imaging surface of the image sensor 870 is 0.962 mm.

TABLE 8

| | |
|---|---|
| f | 2.4 |
| f1 | −4.5835 |
| f2 | 1.362868 |
| f3 | −2.465 |
| f4 | 6.120523 |
| f5 | 70.0162 |
| v1 | 56.1 |
| v2 | 56.1 |
| v3 | 23.5 |
| v4 | 56.1 |
| v5 | 23.5 |
| OAL | 4.971 |
| BFL | 0.962 |

In this example, respective characteristics (radii of curvature, thicknesses, refractive indices, and Abbe numbers) of lenses are illustrated in FIG. 31.

In the eighth embodiment, the first lens 810 has a negative refractive power, and has a meniscus shape of which an object-side surface is convex. For example, a first surface of the first lens 810 is convex, at least, in the paraxial region, and a second surface of the first lens 810 is concave, at least, in the paraxial region.

The second lens 820 has a positive refractive power, and has a meniscus shape of which two surfaces are convex. For example, first and second surfaces of the second lens 820 are convex, at least, in the paraxial region.

The third lens 830 has a negative refractive power and has two surfaces that are concave. For example, first and second surfaces of the third lens 830 are concave, at least, in the paraxial region.

The fourth lens 840 has a positive refractive power, and has a meniscus shape of which an image-side surface is convex. For example, a first surface of the fourth lens 840 is concave, at least, in the paraxial region, and a second surface of the fourth lens 840 is convex, at least, in the paraxial region.

The fifth lens 850 has a positive refractive power, and has a meniscus shape of which an object-side surface is convex. For example, a first surface of the fifth lens 850 is convex, at least, in the paraxial region, and a second surface of the fifth lens 850 is concave, at least, in the paraxial region. In addition, the fifth lens 850 has at least one inflection point formed on at least one of the first and second surfaces thereof.

Further, the respective surfaces of the first to fifth lenses 810 to 850 have aspherical surface coefficients as illustrated in FIG. 32. However, persons skilled in the art will appreciate that some variation in the aspherical surface coefficients may exist without departing from the results and benefits of the embodiment.

In addition, the stop is disposed in front of the object-side surface of the first lens 810.

Figure 30:
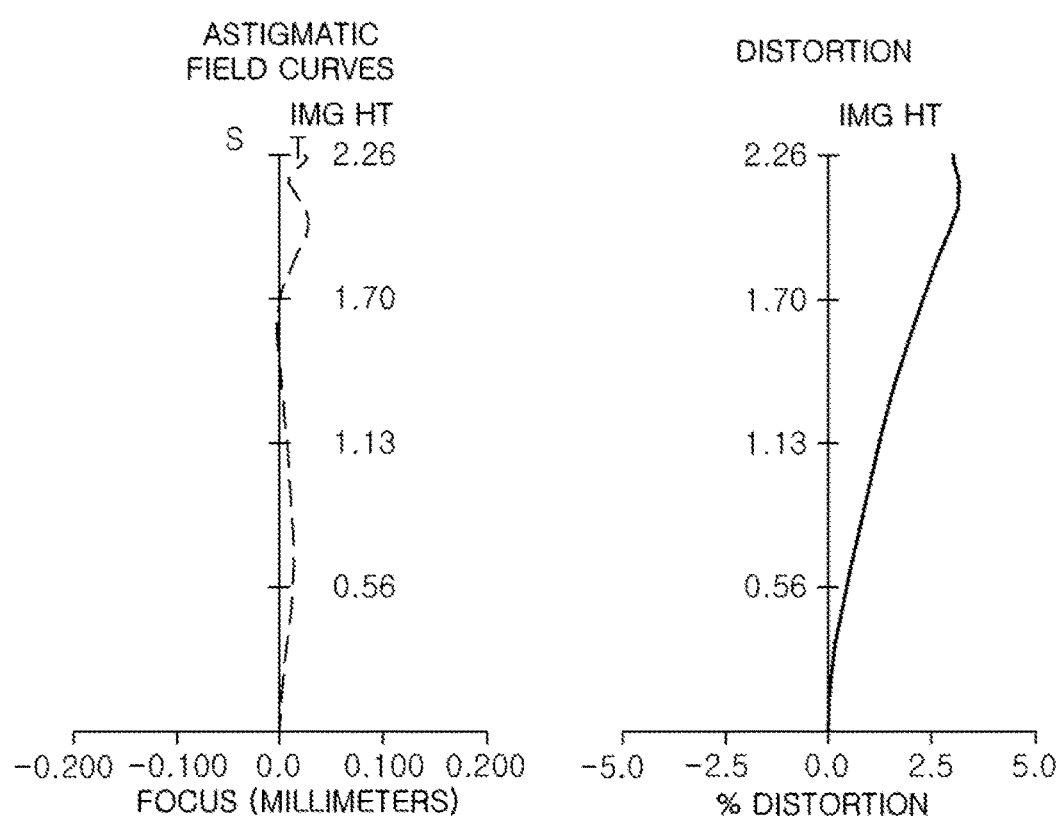
FIG. 30 is graphs having curves illustrating aberration characteristics of the optical system illustrated in FIG. 29.

In addition, the optical system configured as described above has aberration characteristics as illustrated in FIG. 30. However, persons skilled in the art will appreciate that some variation in the aberration characteristics may exist without departing from the results and benefits of the embodiment.

Meanwhile, as shown in Table 9, the optical systems, according to the first to eighth embodiments, satisfy the above-mentioned Conditional Expressions 1 through 17, such that optical performances of the lenses are improved, a wide field of view and a brighter image are realized.

TABLE 9

| Conditional Expression | Example 1 | Example 2 | Example 3 | Example 4 | Example 5 | Example 6 | Example 7 | Example 8 |
|---|---|---|---|---|---|---|---|---|
| −3.0 < f1/f < −1.0 | −1.86 | −1.89 | −1.85 | −1.86 | −1.88 | −1.89 | −1.92 | −1.91 |
| 20 < v2 − v3 < 40 | 32.60 | 32.60 | 32.60 | 32.60 | 32.60 | 32.60 | 32.60 | 32.60 |
| 20 < v1 − v3 < 40 | 32.60 | 32.60 | 32.60 | 32.60 | 32.60 | 32.60 | 32.60 | 32.60 |
| 20 < v1 − v5 < 40 | 32.60 | 32.60 | 32.60 | 32.60 | 32.60 | 32.60 | 32.60 | 32.60 |
| 0 < f2/f < 1.2 | 0.57 | 0.57 | 0.57 | 0.57 | 0.57 | 0.57 | 0.57 | 0.57 |
| 0 < |f3/f| < 2.0 | −1.09 | −1.09 | −1.07 | −1.07 | −1.06 | −1.05 | −1.03 | −1.03 |
| f4/f > 2.0 | 3.14 | 3.16 | 3.04 | 3.03 | 3.04 | 2.99 | 2.77 | 2.55 |
| f5/f > 0.0 | 31.39 | 782.70 | 2319.26 | 212.32 | 48.27 | 29.41 | 21.61 | 29.17 |
| OAL/f < 2.2 | 2.07 | 2.07 | 2.08 | 2.07 | 2.07 | 2.07 | 2.07 | 2.07 |
| 1.0 < |f1/f2| < 5.0 | −3.24 | −3.28 | −3.24 | −3.25 | −3.29 | −3.32 | −3.38 | −3.36 |
| 0.0 < |f2/f3| < 1.4 | −0.53 | −0.53 | −0.54 | −0.53 | −0.54 | −0.54 | −0.55 | −0.55 |
| BFL/f < 0.55 | 0.39 | 0.38 | 0.39 | 0.38 | 0.39 | 0.39 | 0.38 | 0.40 |
| Df/f < 0.5 | 0.26 | 0.27 | 0.27 | 0.27 | 0.27 | 0.27 | 0.28 | 0.28 |
| r3/f > 0.4 | 0.53 | 0.53 | 0.53 | 0.53 | 0.53 | 0.53 | 0.53 | 0.53 |
| |r8/f| > 0.3 | −0.49 | −0.48 | −0.48 | −0.47 | −0.48 | −0.47 | −0.47 | −0.45 |
| FOV | 84.9 | 84.9 | 85.6 | 84.9 | 84.9 | 84.9 | 84.9 | 84.9 |
| FNO | 2.14 | 2.16 | 2.17 | 2.17 | 2.17 | 2.16 | 2.15 | 2.16 |

As set forth above, in an optical system according to embodiments, an aberration improvement effect is increased, while a wide field of view and high levels of resolution are produced.

Further, brighter images are captured with the optical system.

Although in the embodiments described above with respect to FIGS. 1 through 32, the fifth lens to be in contact to the infrared cut-off filter, the fifth lens may be placed at a distance from the infrared cut-off filter. In an alternative embodiment, the infrared cut-off filter may be shaped to mirror the image-side surface or the second surface of the fifth lens, thereby forming an integral part of the fifth lens.

Also, in one embodiment, each of the first to fifth lenses may be separate lenses configured as described above. A distance between lenses may vary. In another embodiment, at least one of the first to fifth lenses may be operatively connected or in contact with another one of the first to fifth lenses.

In a further alternative embodiment, two or more of the lenses of the first to fifth lenses may be configured as a group and in operative connection or contact with another lens. For instance, the first, second, and third lenses may be in contact with each other as a first group lens, while the fourth and fifth lenses are configured separate from each other and from the first group lens. In the alternative, the first, second, and third lenses may be in contact with each other as a first group lens, and the fourth and the fifth lenses may be in contact with each other as a second group lens.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical system, comprising:
    a first lens comprising a negative refractive power;
    a second lens;
    a third lens;
    a fourth lens; and
    a fifth lens comprising a positive refractive power and an image-side surface being concave in a paraxial region,
    wherein the first to fifth lenses are sequentially disposed from an object side to an image side,
    wherein f4, a focal length of the fourth lens, and, f, an overall focal length of the optical system including the first to fifth lenses satisfy f4/f>2.0.

2. The optical system of claim 1, wherein, f1, a focal length of the first lens is f1 and, f, an overall focal length of the optical system including the first to fifth lenses satisfy −3.0<f1/f<−1.0.

3. The optical system of claim 1, wherein, v1, an Abbe number of the first lens, v2, an Abbe number of the second lens, v3, an Abbe number of the third lens and, v5, an Abbe number of the fifth lens satisfy at least one of 20<v2−v3<40, 20<v1−v3<40 and 20<v1−v5<40.

4. The optical system of claim 1, wherein, f2, a focal length of the second lens is f2 and, f, an overall focal length of the optical system including the first to fifth lenses satisfy 0<f2/f<1.2.

5. The optical system of claim 1, wherein, f3, a focal length of the third lens and, f, an overall focal length of the optical system including the first to fifth lenses satisfy 0<|f3/f|<2.0.

6. The optical system of claim 1, wherein, f5, a focal length of the fifth lens, and, f, an overall focal length of the optical system including the first to fifth lenses satisfy f5/f>0.

7. The optical system of claim 1, further comprising:
    an image sensor configured to convert an image of a subject incident through the first to fifth lenses into an electric signal,
        wherein, OAL, a distance from an object-side surface of the first lens to an imaging surface of the image sensor and, f, an overall focal length of the optical system including the first to fifth lenses satisfy OAL/f<2.2.

8. The optical system of claim 1, wherein, f1, a focal length of the first lens and, f2, a focal length of the second lens satisfy 1.0<|f1/f2|<5.0.

9. The optical system of claim 1, wherein, f2, a focal length of the second lens and, f3, a focal length of the third lens satisfy 0.0<|f2/f3|<1.4.

10. The optical system of claim 1, further comprising:
    an image sensor configured to convert an image of a subject incident through the first to fifth lenses into an electric signal,
        wherein, BFL, a distance from an image-side surface of the fifth lens to an imaging surface of the image sensor and, f, an overall focal length of the optical system including the first to fifth lenses satisfy BFL/f<0.55.

11. The optical system of claim 1, wherein, D1, a distance from an image-side surface of the first lens to an object-side surface of the second lens and, f, an overall focal length of the optical system including the first to fifth lenses satisfy D1/f<0.5.

12. The optical system of claim 1, wherein, r3, a radius of curvature of an object-side surface of the second lens, and, f, an overall focal length of the optical system including the first to fifth lenses satisfy r3/f>0.4.

13. The optical system of claim 1, wherein, r8, a radius of curvature of an image-side surface of the fourth lens and, f, an overall focal length of the optical system including the first to fifth lenses satisfy |r8/f|>0.3.

14. The optical system of claim 1, wherein, FOV, a field of view of the optical system satisfies FOV>80.

15. The optical system of claim 1, wherein, FNO, an inverse number of an aperture ratio of the optical system satisfies FNO<2.2.

16. The optical system of claim 1, wherein at least one inflection point is formed on at least one of the first and second surfaces of the fifth lens, and an absolute value of a radius of curvature of a second surface of the fifth lens in a paraxial region is larger than an absolute value of a radius of curvature of the first surface of the fifth lens in the paraxial region.

17. An optical system, comprising:
    a first lens comprising a negative refractive power;
    a second lens;
    a third lens;
    a fourth lens comprising a positive refractive power; and
    a fifth lens comprising a positive refractive power and an image-side surface being concave in a paraxial region,
    wherein the first to fifth lenses are sequentially disposed from an object side and an image side, wherein f4, a focal length of the fourth lens, and, f, an overall focal length of the optical system including the first to fifth lenses satisfy f4/f>2.0.

* * * * *